(12) United States Patent
Tsuchiya

(10) Patent No.: US 7,853,139 B2
(45) Date of Patent: Dec. 14, 2010

(54) OPTICAL DEVICE, ILLUMINATION APPARATUS, AND CAMERA

(75) Inventor: Miki Tsuchiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 68 days.

(21) Appl. No.: 12/418,087

(22) Filed: Apr. 3, 2009

(65) Prior Publication Data

US 2009/0252485 A1    Oct. 8, 2009

(30) Foreign Application Priority Data

Apr. 8, 2008    (JP)    ............................. 2008-100107

(51) Int. Cl.
*G03B 15/06*    (2006.01)
*G02B 1/06*    (2006.01)
*F21V 7/07*    (2006.01)
*G02B 3/12*    (2006.01)

(52) U.S. Cl. .................. 396/175; 396/200; 359/665; 362/296.09

(58) Field of Classification Search .................. 396/175
See application file for complete search history.

(56) References Cited

U.S. PATENT DOCUMENTS

| 7,245,439 B2 | 7/2007 | Kuiper et al. | ............... 359/665 |
| 2008/0088940 A1 | 4/2008 | Li et al. | ....................... 359/666 |

FOREIGN PATENT DOCUMENTS

| JP | 2002-162507 | 6/2000 |
| JP | 2000-356708 | 12/2000 |
| JP | 2002-162507 | 6/2002 |
| JP | 2007-519025 | 7/2007 |
| JP | 2007-212943 | * 8/2007 |
| JP | 2007-225779 | * 9/2007 |
| JP | 2008-040455 | 2/2008 |
| WO | 2005/006029 A1 | 1/2005 |

OTHER PUBLICATIONS

Machine English Translation of JP 2007-225779, 29 pages, Sep. 6, 2007.*
Machine English Translation of JP 2007-212943, 28 pages. Aug. 23, 2007.*
European Search Report dated Jul. 13, 2010 corresponding to European Patent Appln. No. 090004730.9.

* cited by examiner

*Primary Examiner*—Melissa J Koval
(74) *Attorney, Agent, or Firm*—K & L Gates LLP

(57) ABSTRACT

An optical device includes a housing having first to fourth sidewalls and top and bottom plates; and (M−1) partitions between the first and second sidewalls, and has M lens chambers, each filled with first and second liquids forming a liquid lens. A first lens chamber is defined by the first, third, and fourth sidewalls, first partition, and top and bottom plates. The top plate, first sidewall, and first partition respectively have first to third electrodes. An (m+1)-th lens chamber is defined by an m-th partition, third sidewall, (m+1)-th partition, fourth sidewall, and top and bottom plates, m being 1, 2, . . . , or M−2. The top plate, m-th partition, and (m+1)-th partition respectively have first to third electrodes. An M-th lens chamber is defined by an (M−1)-th partition, second to fourth sidewalls, and top and bottom plates. The top plate, (M−1)-th partition, and second sidewall respectively have first to third electrodes.

30 Claims, 12 Drawing Sheets

X-AXIS DIRECTION
Y-AXIS DIRECTION
Z-AXIS DIRECTION

OPTICAL DEVICE, ILLUMINATION APPARATUS, AND CAMERA

CROSS REFERENCES TO RELATED APPLICATIONS

The present application claims priority to Japanese Priority Patent Application JP 2008-100107 filed in the Japan Patent Office on Apr. 8, 2008, the entire content of which is hereby incorporated by reference.

BACKGROUND

The present application relates to an optical device that utilizes an electrowetting phenomenon, and to an illumination apparatus and a camera that contain such an optical device.

Developments of optical devices that utilize an electrowetting phenomenon (electrocapillary phenomenon) have been made over the recent years. An electrowetting phenomenon refers to a change in the shape of a liquid surface that occurs when the energy at a solid-liquid interface between an electrode surface and an electrically conductive liquid changes in response to a voltage applied between the liquid and the electrode.

FIGS. 12A and 12B are principle diagrams illustrating an electrowetting phenomenon. As schematically shown in FIG. 12A, for example, an insulating film 202 is formed on the surface of an electrode 201, and an electrically conductive liquid droplet 203 of an electrolytic solution is set on the insulating film 202. The surface of the insulating film 202 is given a water-repellent treatment. Thus, when a voltage is not applied, a contact angle $\theta_0$ between the surface of the insulating film 202 and the liquid droplet 203 is large since interaction energy therebetween is low, as shown in FIG. 12A. The contact angle $\theta_0$ is an angle formed between the surface of the insulating film 202 and a tangent line of the liquid droplet 203 and depends on properties such as the surface tension of the liquid droplet 203 and the surface energy of the insulating film 202.

On the other hand, as schematically shown in FIG. 12B, when a voltage is applied between the electrode 201 and the liquid droplet 203, electrolyte ions in the liquid droplet 203 becomes concentrated near the surface of the insulating film 202 so as to cause a change in the charged amount of a charged double-layer, thereby inducing a change in the surface tension of the liquid droplet 203. This phenomenon is called an electrowetting phenomenon in which a contact angle $\theta_v$ of the liquid droplet 203 changes in accordance with the magnitude of the applied voltage. In other words, in FIG. 12B, the contact angle $\theta_v$ is a function of an applied voltage V and can be expressed by Lippman-Young's equation (A) below:

$$\cos(\theta_v) = \cos(\theta_0) + (1/2)(\varepsilon_0 \cdot \varepsilon)/(\gamma_{LG} \cdot t) \times V^2 \quad (A)$$

where $\varepsilon_0$ denotes a dielectric constant in vacuum, $\varepsilon$ denotes a relative dielectric constant of the insulating film 202, $\gamma_{LG}$ denotes the surface tension of the electrolytic solution, and t denotes the film thickness of the insulating film 202.

Accordingly, the surface shape (curvature) of the liquid droplet 203 changes in accordance with the magnitude of voltage V applied between the electrode 201 and the liquid droplet 203. Therefore, when the liquid droplet 203 is used as a lens element, an optical element with an electrically controllable focal position (focal length) can be achieved.

Optical devices that employ such an optical element have been developed. For example, Japanese Unexamined Patent Application Publication No. 2000-356708 proposes a lens array for a stroboscopic apparatus. Regarding this lens array, an electrically conductive liquid and electrically insulating liquid droplets arranged in an array on a water-repellent film formed on the surface of a substrate are sealed so as to form variable focal-length lenses. The individual lenses are each formed by the shape of the interface between the electrically insulating liquid and the electrically conductive liquid, and the shape of each lens is electrically controlled by utilizing the electrowetting phenomenon so as to change the focal length. As another example, Japanese Unexamined Patent Application Publication No. 2002-162507 discloses a columnar lens formed of a liquid lens.

SUMMARY

However, with the lens array disclosed in Japanese Unexamined Patent Application Publication No. 2000-356708, it is difficult to obtain a high optical power. In other words, even if the curvature of the lenses is changed from a concave shape to a flat shape by turning the voltage on and off, it is difficult to obtain a large variable rate. With the lens array and the columnar lens disclosed in Japanese Unexamined Patent Application Publication Nos. 2000-356708 and 2002-162507, it is difficult to shift the optical axis of the lens.

It is desirable to provide an optical device formed of a liquid lens that utilizes an electrowetting phenomenon and having a configuration and structure that allows for a high optical power, and to provide an illumination apparatus and a camera that contain such an optical device.

An illumination apparatus according to first and second embodiments includes an optical device, light-emitting means, and a reflecting mirror that reflects light emitted from the light-emitting means.

A camera according to first and second embodiments has a stroboscopic apparatus that includes an optical device, light-emitting means, and a reflecting mirror that reflects light emitted from the light-emitting means.

In the description below, an optical device according to a first embodiment, the optical device included in the illumination apparatus according to the first embodiment, and/or the optical device included in the stroboscopic apparatus of the camera according to the first embodiment may sometimes be collectively referred to as an "optical device according to the first embodiment". Moreover, an optical device according to a second embodiment, the optical device included in the illumination apparatus according to the second embodiment, and/or the optical device included in the stroboscopic apparatus of the camera according to the second embodiment may sometimes be collectively referred to as an "optical device according to the second embodiment". For the sake of convenience, in the optical device according to the first embodiment, a direction in which partition members extend (i.e., a direction in which an axis of a columnar lens extends) will be referred to as a Z-axis direction, a direction orthogonal to the Z-axis direction and in which light is emitted from the optical device will be referred to as an X-axis direction, and a direction orthogonal to the X-axis and Z-axis directions will be referred to as a Y-axis direction. A top plate and/or a bottom plate is/are normally included in an X-Z plane. Furthermore, for the sake of convenience, in the optical device according to the second embodiment, a direction in which light is emitted from the optical device will be referred to as an X-axis direction, one of the directions that is orthogonal to the X-axis direction will be referred to as a Z-axis direction, and a direction orthogonal to the X-axis and Z-axis directions will be referred to as a Y-axis direction. A top plate and/or a bottom plate is/are normally included in an X-Z plane.

The optical device according to the first embodiment includes a housing that has a first sidewall member, a second sidewall member opposed to the first sidewall member, a third sidewall member that connects one edge of the first sidewall member and one edge of the second sidewall member, a fourth sidewall member that connects another edge of the first sidewall member and another edge of the second sidewall member, a top plate attached to top surfaces of the first sidewall member, the second sidewall member, the third sidewall member, and the fourth sidewall member, and a bottom plate attached to bottom surfaces of the first sidewall member, the second sidewall member, the third sidewall member, and the fourth sidewall member; and (M−1) partition members arranged parallel to and between the first sidewall member and the second sidewall member. M lens chambers are arranged in a side-by-side manner. Each lens chamber is filled with a first liquid and a second liquid that form a liquid lens functioning as a columnar lens whose axis extends parallel to a direction in which the partition members extend (i.e., the Z-axis direction). A first lens chamber is defined by the first sidewall member, the third sidewall member, a first partition member, the fourth sidewall member, the top plate, and the bottom plate. A part of an inner surface of the top plate that defines the first lens chamber is provided with a first electrode. A part of an inner surface of the first sidewall member that defines the first lens chamber is provided with a second electrode. A part of an inner surface of the first partition member that defines the first lens chamber is provided with a third electrode. An (m+1)-th lens chamber is defined by an m-th partition member, the third sidewall member, an (m+1)-th partition member, the fourth sidewall member, the top plate, and the bottom plate, m being equal to 1, 2, . . . , or M−2. A part of the inner surface of the top plate that defines the (m+1)-th lens chamber is provided with a first electrode. A part of an inner surface of the m-th partition member that defines the (m+1)-th lens chamber is provided with a second electrode. A part of an inner surface of the (m+1)-th partition member that defines the (m+1)-th lens chamber is provided with a third electrode. An M-th lens chamber is defined by an (M−1)-th partition member, the third sidewall member, the second sidewall member, the fourth sidewall member, the top plate, and the bottom plate. A part of the inner surface of the top plate that defines the M-th lens chamber is provided with a first electrode. A part of an inner surface of the (M−1)-th partition member that defines the M-th lens chamber is provided with a second electrode. A part of an inner surface of the second sidewall member that defines the M-th lens chamber is provided with a third electrode.

The M lens chambers are arranged side-by-side in the Y-axis direction. In this case, the value of M may be 3 or more, and is preferably within a range of 3 to 9.

The optical device according to the second embodiment includes a housing that has an outer wall member having no ends, a top plate attached to a top surface of the outer wall member, and a bottom plate attached to a bottom surface of the outer wall member; and (N−1) partition members having no ends and disposed concentrically with the outer wall member. The optical device has (N−1) annular lens chambers and a central lens chamber surrounded by an (N−1)-th partition member. Each lens chamber is filled with a first liquid and a second liquid that form a liquid lens. A first lens chamber is defined by the outer wall member, a first partition member, the top plate, and the bottom plate. A part of an inner surface of the top plate that defines the first lens chamber is provided with a first electrode. A part of an inner surface of the outer wall member that defines the first lens chamber is provided with a second electrode. A part of an inner surface of the first partition member that defines the first lens chamber is provided with a third electrode. An (n+1)-th lens chamber is defined by an n-th partition member, an (n+1)-th partition member, the top plate, and the bottom plate, n being equal to 1, 2, . . . , or N−2. A part of the inner surface of the top plate that defines the (n+1)-th lens chamber is provided with a first electrode. A part of an inner surface of the n-th partition member that defines the (n+1)-th lens chamber is provided with a second electrode. A part of an inner surface of the (n+1)-th partition member that defines the (n+1)-th lens chamber is provided with a third electrode. A part of the inner surface of the top plate that defines the central lens chamber, which is equivalent to an N-th lens chamber, is provided with a first electrode. A part of an inner surface of the (N−1)-th partition member that defines the central lens chamber is provided with a second electrode or a third electrode.

In this case, the value of N may be 3 or more, and is preferably within a range of 3 to 9.

In the optical device according to the first embodiment, at least a surface of each of the first sidewall member, the second sidewall member, and the partition members that are adjacent to an interface between the first liquid and the second liquid may be given a water-repellent treatment. In the optical device according to the second embodiment, at least a surface of each of the outer wall member and the partition members that are adjacent to an interface between the first liquid and the second liquid may be given a water-repellent treatment. Examples of a water-repellent treatment include a method of forming a polyparaxylylene film by chemical vapor deposition (CVD) and a method of forming a coating by using a fluorine-based polymer such as polyvinylidene fluoride (PVDF) or polytetrafluoroethylene (PTFE). Alternatively, the surfaces of at least the first sidewall member, the second sidewall member, and the partition members that are adjacent to the interface between the first liquid and the second liquid may each be coated with a multilayer structure having a combination of high dielectric layers and water-repellent layers, and/or the surfaces of at least the outer wall member and the partition members that are adjacent to the interface between the first liquid and the second liquid may each be coated with a multilayer structure having a combination of high dielectric layers and water-repellent layers.

In the optical device according to the first or second embodiment, a bottom surface of each partition member may extend to the bottom plate, and a top surface of each partition member may extend to the top plate. For the sake of convenience, such a configuration will be referred to as a "first-A configuration" or a "second-A configuration". The top surface of each partition member refers to a surface facing the top plate, whereas the bottom surface of each partition member refers to a surface facing the bottom plate. The same applies to the description hereinafter.

Alternatively, in the optical device according to the first or second embodiment, the bottom surface of each partition member may extend to the bottom plate, and the top surface of each partition member and the top plate may have a gap therebetween. For the sake of convenience, such a configuration will be referred to as a "first-B configuration" or a "second-B configuration".

As another alternative, in the optical device according to the first or second embodiment, the bottom surface of each partition member and the bottom plate may have a gap therebetween, and the top surface of each partition member may extend to the top plate. For the sake of convenience, such a configuration will be referred to as a "first-C configuration" or a "second-C configuration".

As a further alternative, in the optical device according to the first or second embodiment, the bottom surface of each partition member and the bottom plate may have a gap therebetween, and the top surface of each partition member and the top plate may have a gap therebetween. For the sake of convenience, such a configuration will be referred to as a "first-D configuration" or a "second-D configuration". In the second-D configuration, the partition members may be fixed to the outer wall member, the bottom plate, and the top plate, for example, by an appropriate method.

In the optical device according to the first or second embodiment (which may sometimes be collectively referred to as an "optical device according to each embodiment"), the first liquid and the second liquid are preferably insoluble and unmixable with each other so that an interface between the first liquid and the second liquid functions as a lens surface.

In the optical device according to each embodiment, the first liquid may have an electrically conductive property and the second liquid may have an insulating property. Each first electrode may be in contact with the first liquid, each second electrode may be in contact with the first liquid and the second liquid through an insulating film, and each third electrode may be in contact with the first liquid and the second liquid through an insulating film.

In the optical device according to each embodiment, it is preferable that the top plate, the bottom plate, and the first electrodes are each composed of a transparent material that transmits light incident on the optical device.

In the optical device according to the first embodiment, different voltages may be applied to the second electrode and the third electrode in each lens chamber so as to change an optical power of the liquid lens functioning as the columnar lens and to shift an optical axis of the liquid lens functioning as the columnar lens in a direction (i.e., the Y-axis direction) orthogonal to the optical axis (i.e., the Z-axis direction). In the optical device according to the first embodiment, when the columnar lenses exhibit their optical power as a result of voltage applied to the first electrodes, the second electrodes, and the third electrodes, the optical power of the columnar lenses is substantially zero in the X-Z plane (or a plane parallel to the X-Z plane), whereas the optical power of the columnar lenses is a finite value in the X-Y plane. On the other hand, in the optical device according to the second embodiment, different voltages may be applied to the second electrode and the third electrode in each lens chamber so as to change an optical power of the liquid lens. Furthermore, in the optical device according to each embodiment, different voltages may be applied to the second electrode and the third electrode in each lens chamber so as to allow the entire optical device to function as a Fresnel lens. The term "the optical axis of the liquid lens" used here is a line that connects centers of curvature of two optical surfaces of a liquid lens, when the liquid lens is viewed in cross section taken along the X-Y plane.

Examples of a liquid having an electrically conductive property or a polar liquid (which may sometimes be collectively referred to as an "electrically conductive liquid" hereinafter) used for forming the liquid lens include water, an electrolytic solution (i.e., an aqueous solution containing an electrolyte such as potassium chloride, sodium chloride, lithium chloride, or sodium sulfate), an aqueous solution of triethylene glycol containing these electrolytes, alcohol with small molecular weight, such as methyl alcohol or ethyl alcohol, a polar liquid such as room temperature molten salt (ionic liquid) or pure water, and a mixture of these liquids. Alcohol, such as methyl alcohol or ethyl alcohol, may be used as an aqueous solution to provide electrical conductivity or with salt to provide electrical conductivity. A liquid having an insulating property or a nonpolar liquid (which may sometimes be collectively referred to as an "electrically insulating liquid" hereinafter) may be, for example, a nonpolar solvent, which includes a hydrocarbon-based material, such as decane, dodecane, hexadecane, or undecane, silicone oil, or a fluorine-based material. The electrically conductive liquid and the electrically insulating liquid preferably have different refractive indices and exist without mixing with each other. In addition, it is desirable that the density of the electrically conductive liquid and the density of the electrically insulating liquid be substantially the same value as much as possible. It is desirable that the electrically conductive liquid and the electrically insulating liquid are transparent liquids that can transmit light incident on the optical device (which will be referred to as "incident light"), but may be colored liquids in some cases.

In the optical device according to each embodiment, the members that transmit the incident light (specifically, at least the top plate and the bottom plate) are preferably composed of a transparent material that can transmit the incident light. In this case, the phrase "a transparent material that can transmit the incident light" means that the transparent material has a light transmittance of 80% or higher with respect to the incident light. Examples of materials used for forming the members that transmit the incident light include acrylic resin, polycarbonate (PC) resin, acrylonitrile butadiene styrene (ABS) resin, polymethyl methacrylate (PMMA), polyarylate resin (PAR), polyethylene terephthalate (PET) resin, and glass. The members that transmit the incident light may be composed of the same material or of different materials.

Depending on the location of use and desired property, each of the electrodes may be composed of an electrically conductive metal oxide, such as an indium tin oxide (ITO) based material, a silver-doped ITO, an indium zinc oxide (IZO), a tin dioxide ($SnO_2$) based material, a diindium trioxide ($In_2O_3$) based material, an antimony pentoxide ($Sb_2O_5$) based material, a zinc oxide (ZnO) based material, an $In_2O_3$—ZnO based material, gallium (Ga) doped ZnO, $In_4Sn_3O_{12}$, or InGaZnO, or may be a transparent electrode composed of metal, an alloy, or a semiconductor material, or may be an electrode composed of opaque metal or alloy. In detail, each electrode may be composed of, for example, metal such as aluminum (Al), tungsten (W), niobium (Nb), tantalum (Ta), molybdenum (Mo), chromium (Cr), copper (Cu), gold (Au), silver (Ag), titanium (Ti), nickel (Ni), cobalt (Co), zirconium (Zr), iron (Fe), platinum (Pt), or zinc (Zn); an alloy containing these metallic elements (e.g., MoW); a chemical compound (e.g., a nitride, such as TiN, or a silicide, such as $WSi_2$, $MoSi_2$, $TiSi_2$, or $TaSi_2$); a semiconductor such as silicon (Si); or a carbon thin film of, for example, diamond. These electrodes can be formed by, for example, an evaporation technique, such as electron beam evaporation or hot filament evaporation, a sputtering technique, a chemical vapor deposition (CVD) technique, a combination of ion plating and etching, a screen printing technique, a plating technique (such as electroplating or electroless plating), a liftoff technique, a laser ablation technique, or a sol-gel technique.

The insulating films are not particularly limited so long as they are composed of an electrically insulating material, but are preferably composed of a material having a relatively high relative dielectric constant. Although the insulating films preferably have a small film thickness to achieve a relatively large capacitance, it is desired that the insulating films have a film thickness that can ensure sufficient insulating strength. The insulating films may be composed of, for example, a SiO$_2$-based material, such as a SiO$_x$ material, SiN, SiON, a fluorinated silicon oxide, polyimide resin, spin-on-glass (SOG), low-melting glass, or glass paste, a titanium oxide (TiO$_2$), a tantalum oxide (Ta$_2$O$_5$), an aluminum oxide (Al$_2$O$_3$), a magnesium oxide (MgO), a chromium oxide (CrO$_x$), a zirconium oxide (ZrO$_2$), a niobium oxide (Nb$_2$O$_5$), a tin oxide (SnO$_2$), or a vanadium oxide (VO$_x$). The insulating films may be formed by a common technique, such as CVD, coating, sputtering, screen printing, plating, electro-deposition, or dipping.

In the optical device according to each embodiment, a distance L between the adjacent partition members in the Y-axis direction in each lens chamber or a distance L between the outer wall member and the first partition member in the Y-axis direction may be the same value or different values among the lens chambers. Moreover, in each lens chamber, the distance L may be fixed or varied. For example, in each lens chamber of the optical device according to the second embodiment, a section of the lens chamber that extends parallel to the Y-axis direction may have a distance L that is shorter than a distance L in a section of the lens chamber that extends parallel to the Z-axis direction.

In the optical device according to each embodiment, the distance between the second electrode and the third electrode in each lens chamber (i.e., the distance L between the adjacent partition members in the Y-axis direction in each lens chamber or the distance L between the outer wall member and the first partition member in the Y-axis direction) is preferably set lower than or equal to a capillary length $\kappa^{-1}$. A capillary length $\kappa^{-1}$ refers to a maximum length at which the effect the gravity has on an interfacial tension is negligible, and can be expressed by the following equation (B):

$$\kappa^{-1} = \{\Delta\gamma/(\Delta\rho \cdot g)\}^{1/2} \tag{B}$$

where $\Delta\gamma$ denotes an interfacial tension between the electrically conductive liquid and the electrically insulating liquid, $\Delta\rho$ denotes a difference in density between the electrically conductive liquid and the electrically insulating liquid, and g denotes gravitational acceleration.

A capillary length $\kappa^{-1}$ varies depending on the types of two media that form an interface. Table 1 below shows an interfacial tension, a difference in density, and a capillary length when the two media are water and air as well as water and oil.

TABLE 1

|  | INTERFACIAL TENSION ($\Delta\gamma$) | DIFFERENCE IN DENSITY ($\Delta\rho$) | CAPILLARY LENGTH ($\kappa^{-1}$) |
|---|---|---|---|
| WATER AND AIR | 72.88 (mN/m) | 0.99997 (g/cm$^3$) | 2.7 (mm) |
| WATER AND OIL | 29.5 (mN/m) | 0.0129 (g/cm$^3$) | 15.2 (mm) |

The capillary length ($\kappa^{-1}$) is 2.7 mm when the two media are water and air, whereas the capillary length ($\kappa^{-1}$) is 15.2 mm when the two media are water and oil. Thus, the difference in density ($\Delta\rho$) between the electrically conductive liquid and the electrically insulating liquid can be reduced to 0.0129, whereby the aforementioned distance can be set to a maximum of 15.2 mm.

The housing in the optical device according to the first embodiment may have, although not limited to, a rectangular outer shape with longitudinal sides extending in the Z-axis direction and lateral sides extending in the Y-axis direction, a substantially rectangular outer shape with rounded corners and having longitudinal sides extending in the Z-axis direction and lateral sides extending in the Y-axis direction, a square outer shape with one pair of sides extending in the Z-axis direction and the other pair of sides extending in the Y-axis direction, a substantially square outer shape with rounded corners and having one pair of sides extending in the Z-axis direction and the other pair of sides extending in the Y-axis direction, a barrel-like outer shape with a pair of bulging sides extending in the Z-axis direction, or an elliptical or oval outer shape with longitudinal sides extending in the Z-axis direction and lateral sides extending in the Y-axis direction. On the other hand, the housing in the optical device according to the second embodiment may have, although not limited to, a rectangular outer shape with longitudinal sides extending in the Z-axis direction and lateral sides extending in the Y-axis direction, a substantially rectangular outer shape with rounded corners and having longitudinal sides extending in the Z-axis direction and lateral sides extending in the Y-axis direction, a square outer shape with one pair of sides extending in the Z-axis direction and the other pair of sides extending in the Y-axis direction, a substantially square outer shape with rounded corners and having one pair of sides extending in the Z-axis direction and the other pair of sides extending in the Y-axis direction, a circular outer shape, an oval outer shape, or an elliptical outer shape with longitudinal sides extending in the Z-axis direction and lateral sides extending in the Y-axis direction.

When the optical device according to each embodiment has a rectangular outer shape, if a light emission area that contributes to actual light emission from the optical device has a dimension $L_Z$ in the Z-axis direction and a dimension $L_Y$ in the Y-axis direction, $L_Z/L_Y$ is preferably set equal to, although not limited to, one of the following values. Specifically, for example, if a film used in the camera is a so-called 135 film or if the camera is equipped with an image pickup device (such as a charge-coupled device (CCD) or a complementary-metal-oxide-semiconductor (CMOS) image sensor), the value of $L_Z/L_Y$ may be set equal to the aspect ratio of the film or the image pickup device, namely, $L_Z/L_Y=1.5$. If the shooting format is a so-called 6×6, 6×9, 6×7, or 6×4.5 format, the value of $L_Z/L_Y$ may be set equal to 6/6, 9/6, 7/6, or 6/4.5.

The optical device according to each embodiment may be configured to receive light from the top plate and release the light from the bottom plate, or to receive light from the bottom plate and release the light from the top plate.

In the illumination apparatus according to the first or second embodiment (which will be collectively referred to as an "illumination apparatus according to each embodiment" hereinafter) and/or in the camera according to the first or second embodiment (which will collectively be referred to as a "camera according to each embodiment" hereinafter), the light-emitting means may be defined by, for example, a xenon tube, a fluorescent lamp, a lamp, a light-emitting diode, or a semiconductor light-emitting element such as a semiconductor laser. Specific application examples of the illumination apparatus according to each embodiment include a stroboscopic apparatus, a backlight unit used in a display device, and an autofocus fill-light unit of a camera. The camera according to each embodiment may be a camera having any configuration and structure of the related art. In addition, a method for controlling the optical device in the illumination apparatus according to each embodiment or the camera according to each embodiment may be a control method of the related art except for the controlling of desired voltages applied to the first electrodes, the second electrodes, and the third electrodes.

The reflecting mirror can be fabricated by forming a light reflecting portion (light reflecting layer) composed of, for example, aluminum, chromium, or silver on a metallic or plastic body by chemical vapor deposition (CVD) or physical vapor deposition (PVD), such as plating, vacuum deposition, or sputtering.

The sectional shape of the light reflecting portion (which is where the reflecting mirror actually reflects light) when taken along the X-Y plane of the reflecting mirror can be expressed by a parabolic, elliptical or aspherical function. Generally, each type of curved surface can be expressed by the following equation (1).

$$x = \frac{cr^2}{1+\sqrt{1-c^2r^2(1-e^2)}} + a \qquad (1)$$

In equation (1), reference character c denotes a value of curvature of a curved surface at an apex thereof that intersects a Z axis, and e denotes eccentricity. Furthermore, $-e^2$ in equation (1) denotes a conic constant (K). Generally, when K=0, equation (1) represents a sphere. When K=−1, equation (1) represents a paraboloid. When K<−1, equation (1) represents a hyperboloid. When −1<K<0, equation (1) represents an ellipsoid. A function in which a zero-th order value a at the right side of equation (1) is replaced by ($A \times r^4 + B \times r^6 + C \times r^8 + \ldots$) is called an aspherical function. A sectional shape taken along the X-Y plane of a curved surface obtained by the aspherical function may be used for the light reflecting portion.

In the optical device according to each embodiment, the light distribution state is changeable by utilizing an electrowetting phenomenon, and the voltage applied to the second electrode and the voltage applied to the third electrode in each lens chamber can be controlled independently of each other. In consequence, the state of the interface between the first liquid and the second liquid on the second electrode can be made different from the state of the interface between the first liquid and the second liquid on the third electrode. For example, the shape of the liquid lens formed in each lens chamber, as viewed in cross section taken along the X-Y plane, can be made asymmetric. Thus, a high optical power can be obtained, the light distribution state can be controlled independently in multiple directions, and the optical power can be adjusted to various levels. Moreover, for example, the optical axis of the entire optical device can be shifted, and the inclination of the optical axis can be controlled. Furthermore, when the illumination apparatus flashes, the variable rate of the guide number of the strobe light can be increased, and the output light can be balanced. In addition, since a drive unit for, for example, a motor is not necessary, the optical device can be reduced in the number of components, size, thickness, and cost. Moreover, since there are no components that receive a mechanical force, a long-life, highly reliable, noiseless optical device can be advantageously achieved. Furthermore, since the optical device allows for voltage control and has substantially no current flowing therethrough, a low-power optical device can be achieved.

Additional features and advantages are described in, and will be apparent from, the following Detailed Description of the Invention and the figures.

DETAILED DESCRIPTION

The present application will be described below with reference to the drawings according to an embodiment.

First Embodiment

An optical device, an illumination apparatus, and a camera according to a first embodiment specifically relates to the first-A configuration.

Figure 1A:
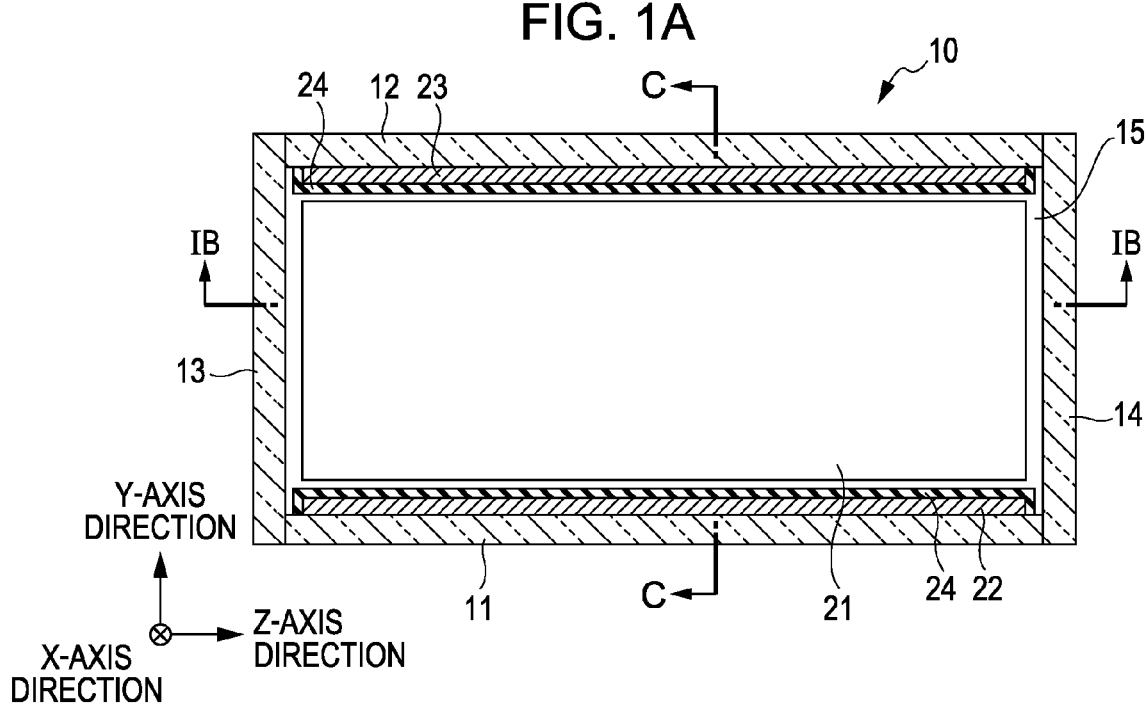
FIG. 1A is a schematic cross-sectional view of a principle optical device taken along line A-A in FIG. 1B.
Figure 1B:
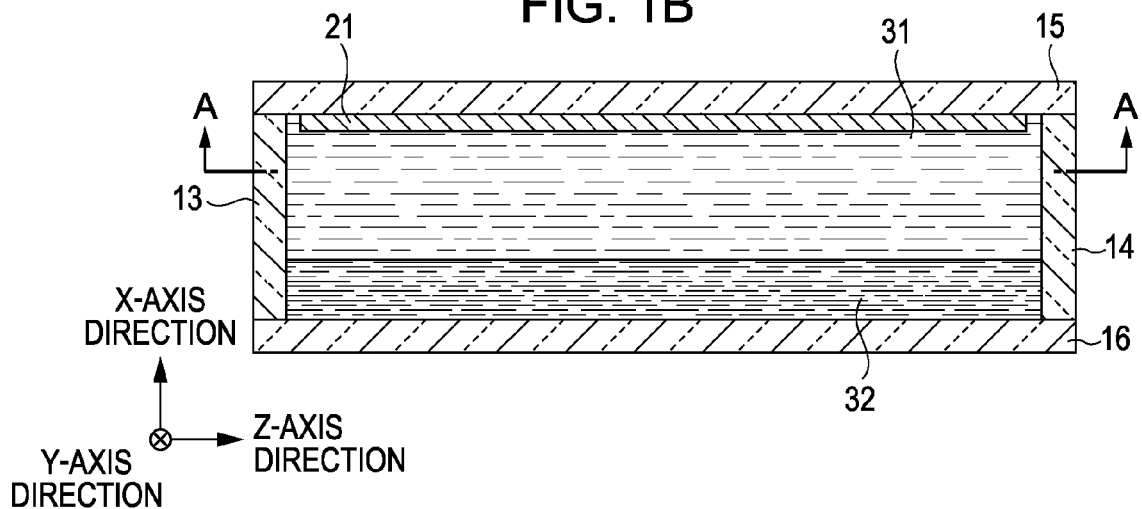
FIG. 1B is a schematic cross-sectional view of the principle optical device taken along line IB-IB in FIG. 1A.
Figure 1C:
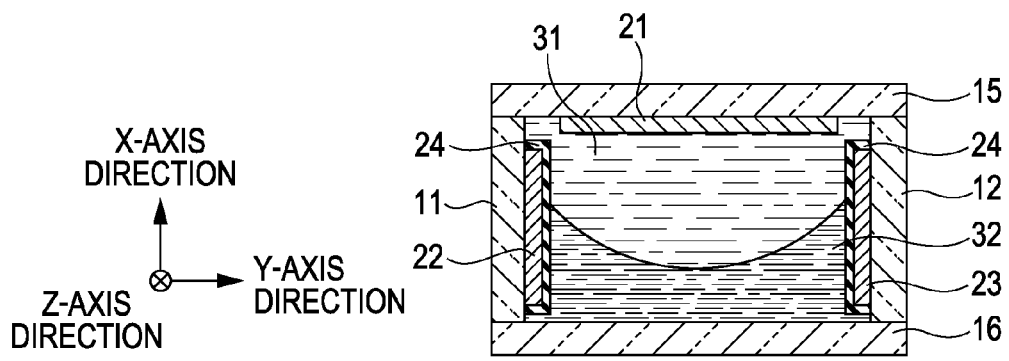
FIG. 1C is a schematic cross-sectional view of the principle optical device taken along line C-C in FIG. 1A.

Before describing the optical device according to the first embodiment and the optical device included in the illumination apparatus and the camera according to the first embodiment, the principle of the optical device will be described first with reference to principle diagrams in FIGS. 1A to 2C. FIG. 1A is a schematic cross-sectional view taken along line A-A in FIG. 1B. FIG. 1B is a schematic cross-sectional view taken along line IB-IB in FIG. 1A (although not showing a first liquid). FIG. 1C and FIGS. 2A to 2C are schematic cross-sectional views taken along line C-C in FIG. 1A. The sectional shape of a liquid lens as taken along an X-Y plane is a schematic shape and is therefore different from the actual shape.

The optical device in the principle diagrams shown in FIGS. 1A to 2C (which will be referred to as a "principle optical device" hereinafter) is equipped with a housing. This housing is constituted by a first sidewall member 11, a second sidewall member 12 opposed to the first sidewall member 11, a third sidewall member 13 that connects one edge of the first sidewall member 11 and one edge of the second sidewall member 12, a fourth sidewall member 14 that connects another edge of the first sidewall member 11 and another edge of the second sidewall member 12, a top plate 15 attached to top surfaces of the first sidewall member 11, the second sidewall member 12, the third sidewall member 13, and the fourth sidewall member 14, and a bottom plate 16 attached to bottom surfaces of the first sidewall member 11, the second sidewall member 12, the third sidewall member 13, and the fourth sidewall member 14. The housing forms a single lens chamber. The lens chamber is filled with a first liquid 31 and a second liquid 32 that form a liquid lens serving as a columnar lens whose axis extends parallel to the direction in which the first sidewall member 11 and the second sidewall member 12 extend (i.e., Z-axis direction).

The inner surface of the top plate 15 is provided with a first electrode 21, the inner surface of the first sidewall member 11 is provided with a second electrode 22, and the inner surface of the second sidewall member 12 is provided with a third electrode 23. In the state shown in FIGS. 1A to 1C, voltage is not applied to the first electrode 21, the second electrode 22, and the third electrode 23.

Figure 2A:
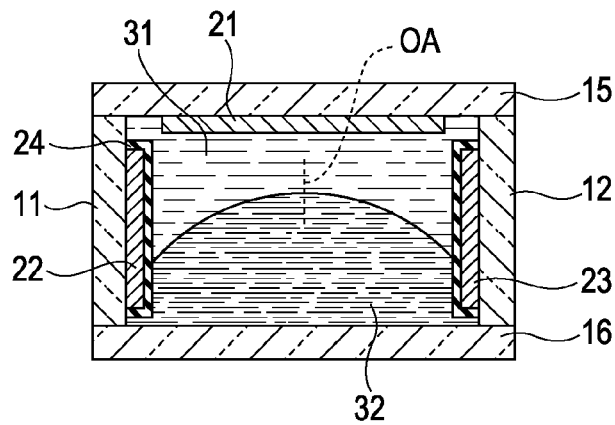
FIGS. 2A to 2C are schematic cross-sectional views of the principle optical device, as taken along line C-C in FIG. 1A, and schematically illustrate the behavior of a liquid lens.
Figure 2B:
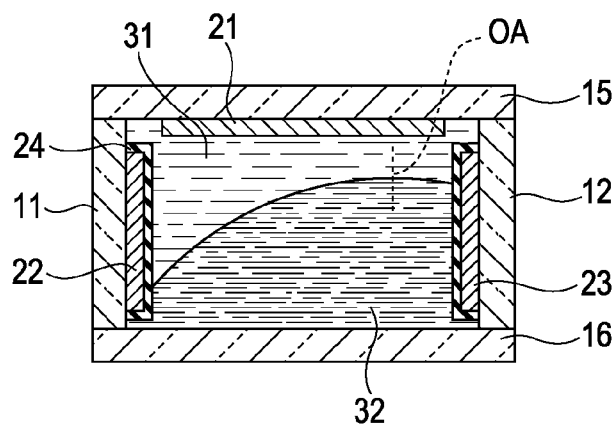
Figure 2C:
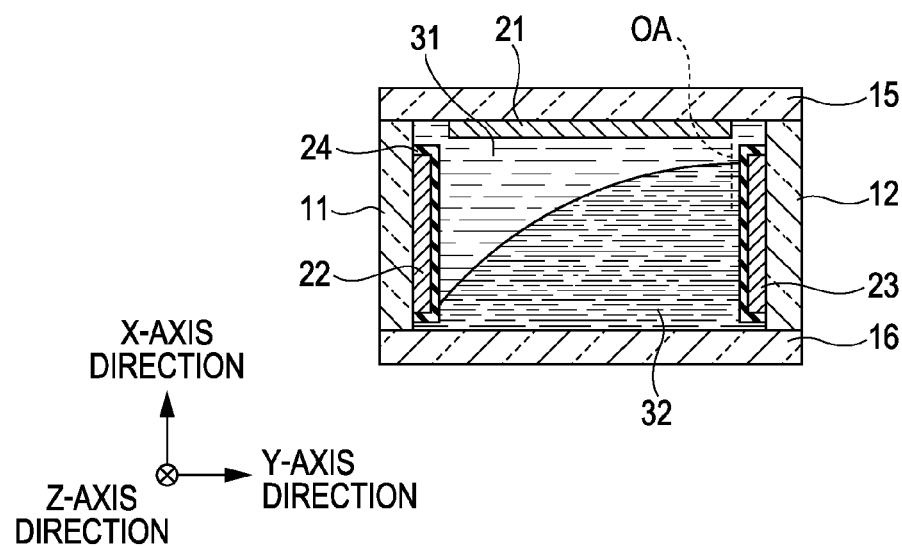

When appropriate voltages are applied to the first electrode 21, the second electrode 22, and the third electrode 23 from this state, the interface between the first liquid 31 and the second liquid 32 changes to the state shown in FIGS. 2A, 2B, or 2C. Specifically, FIG. 2A shows a state obtained when the same voltage is applied to the second electrode 22 and the third electrode 23. In this state, the sectional shape of the liquid lens, when taken along the X-Y plane, formed in the lens chamber is symmetric with respect to an optical axis OA. FIGS. 2B and 2C each show a state obtained when different voltages are applied to the second electrode 22 and the third electrode 23. In this state, the sectional shape of the liquid lens, when taken along the X-Y plane, formed in the lens chamber is asymmetric with respect to the optical axis OA. The potential difference between the second electrode 22 and the third electrode 23 is greater in the state shown in FIG. 2C as compared to the state shown in FIG. 2B. As shown in FIGS. 2B and 2C, depending on the potential difference between the second electrode 22 and the third electrode 23, the optical power of the liquid lens can be changed, and the optical axis OA (indicated with a dotted line) of the liquid lens can be shifted in a Y-axis direction, which is orthogonal to the Z-axis direction. Alternatively, the principle optical device shown in these principle diagrams may be provided in a plurality in a side-by-side arrangement. In that case, the optical axes of the principle optical devices can be entirely shifted by appropriately controlling the voltage applied to the second electrode 22 and the third electrode 23 in each principle optical device, the inclination of the optical axes of the principle optical devices can be entirely changed, and the principle optical devices can entirely function as a Fresnel lens.

Figure 3:
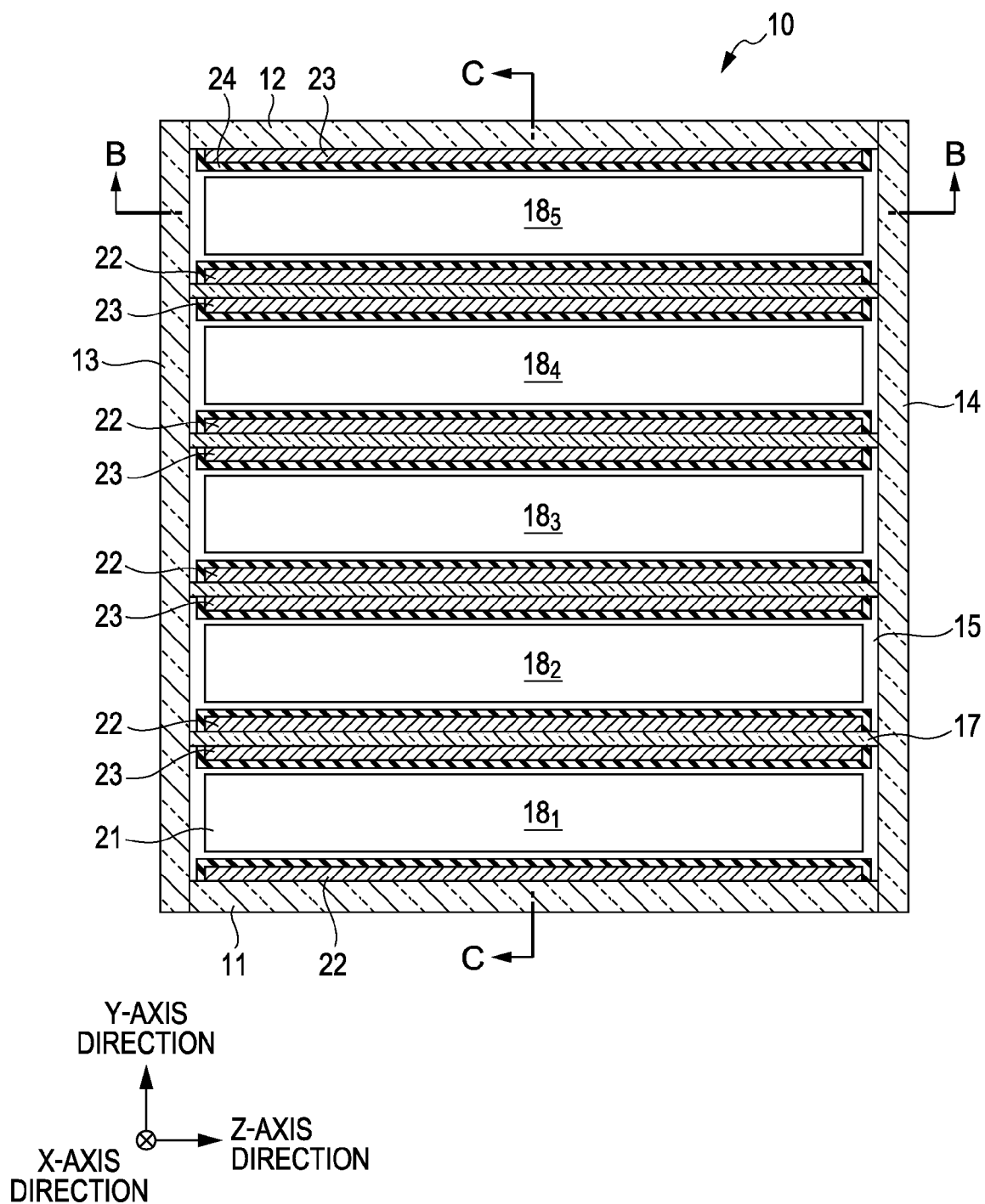
FIG. 3 is a schematic cross-sectional view similar to that taken along line A-A in FIG. 1B and illustrates an optical device according to a first embodiment.
Figure 4A:
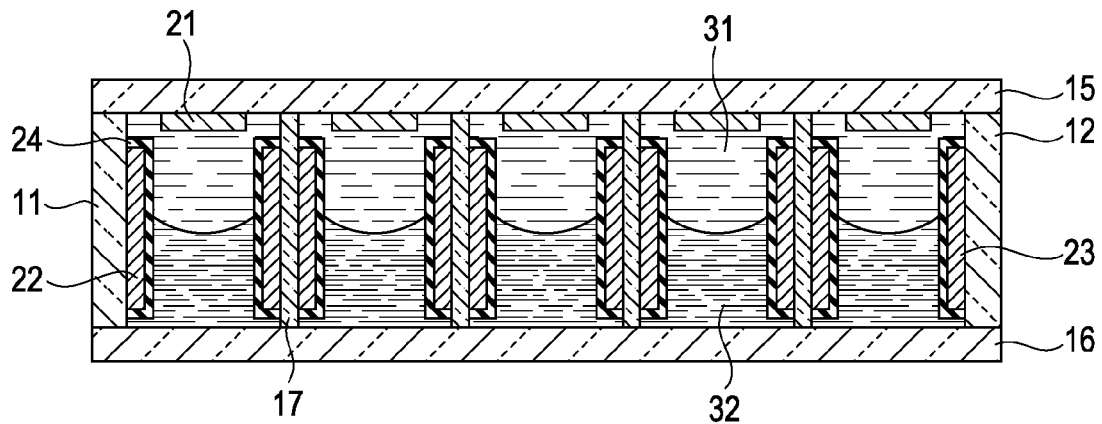
FIGS. 4A to 4C are schematic cross-sectional views of the optical device according to the first embodiment, as taken along line C-C in FIG. 3, and schematically illustrate the behavior of liquid lenses.
Figure 4B:
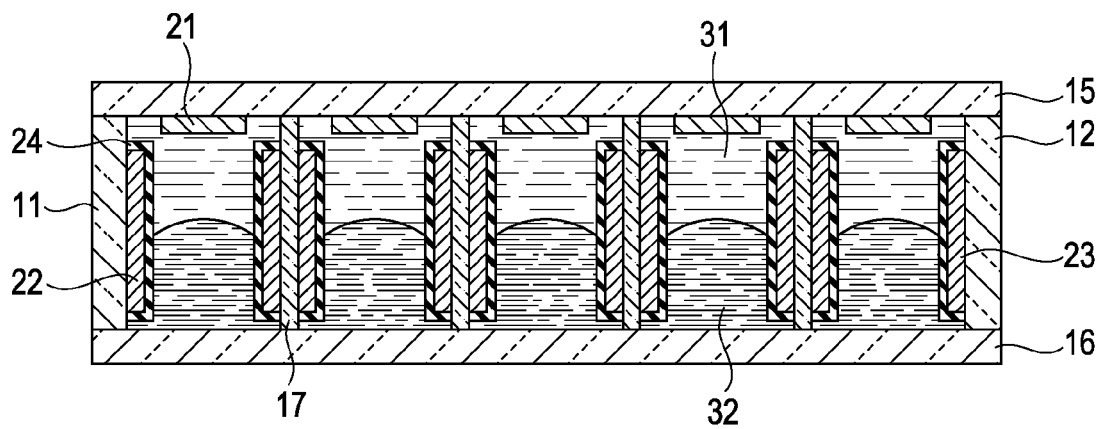
Figure 4C:
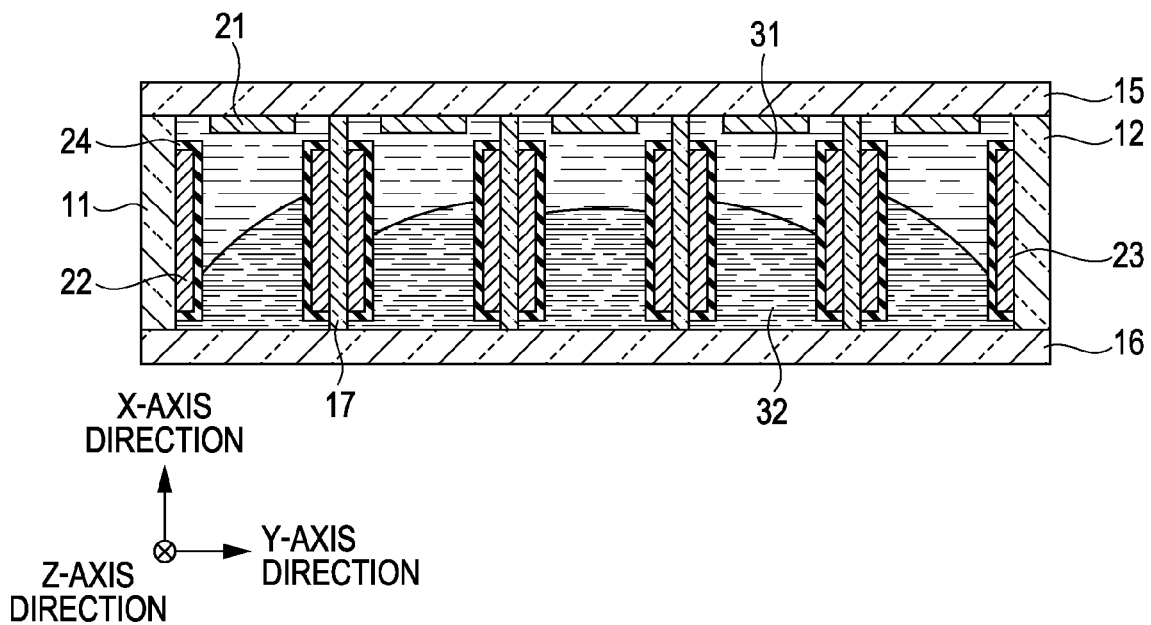
Figure 5A:
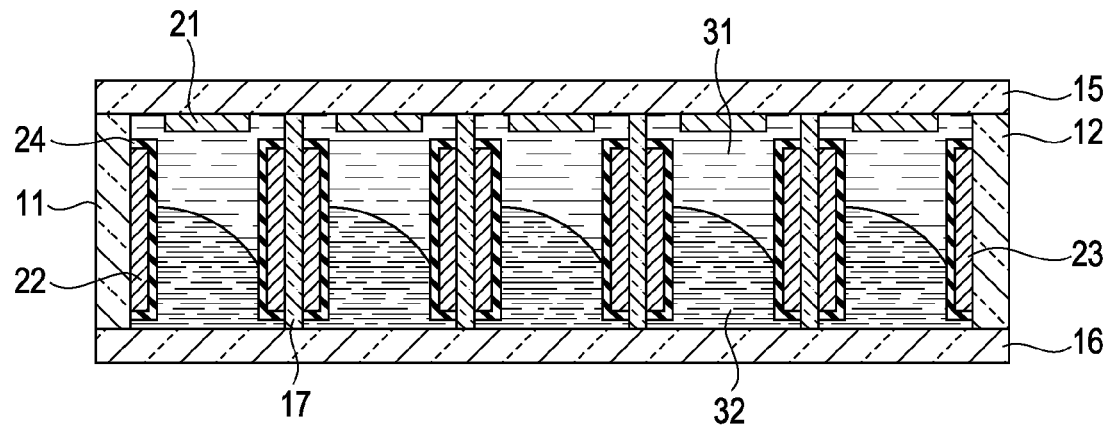
FIGS. 5A and 5B are schematic cross-sectional views of the optical device according to the first embodiment, as taken along line C-C in FIG. 3, and schematically illustrate the behavior of the liquid lenses.
Figure 5B:
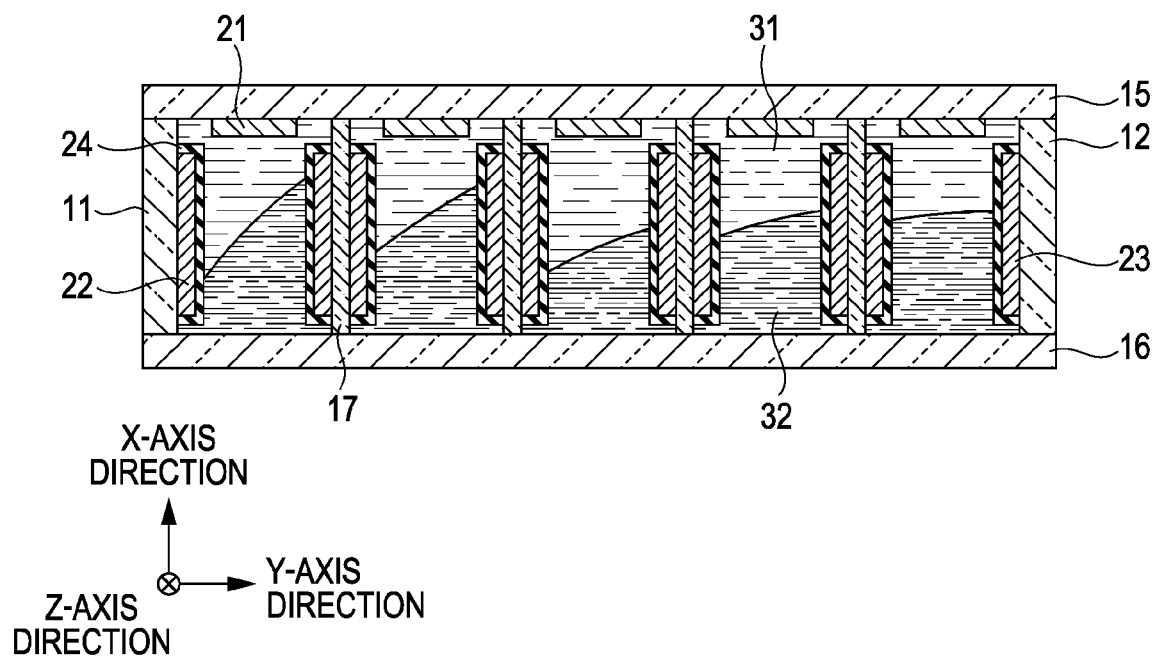

FIG. 3, FIGS. 4A to 4C, and FIGS. 5A and 5B are schematic cross-sectional views of an optical device according to the first embodiment. Specifically, FIG. 3 is a schematic cross-sectional view similar to that taken along line A-A in FIG. 1B. FIGS. 4A to 4C and FIGS. 5A and 5B are schematic cross-sectional views taken along line C-C in FIG. 3. A schematic cross-sectional view taken along line B-B in FIG. 3 is similar to that shown in FIG. 1B.

Figure 7A:
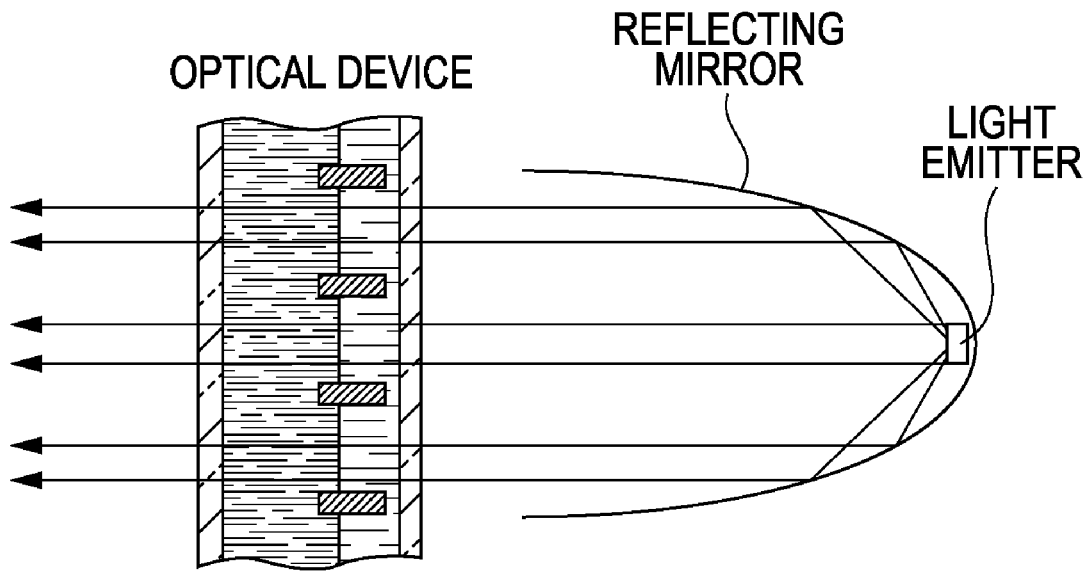
FIGS. 7A and 7B schematically illustrate an illumination apparatus according to the first embodiment.
Figure 7B:
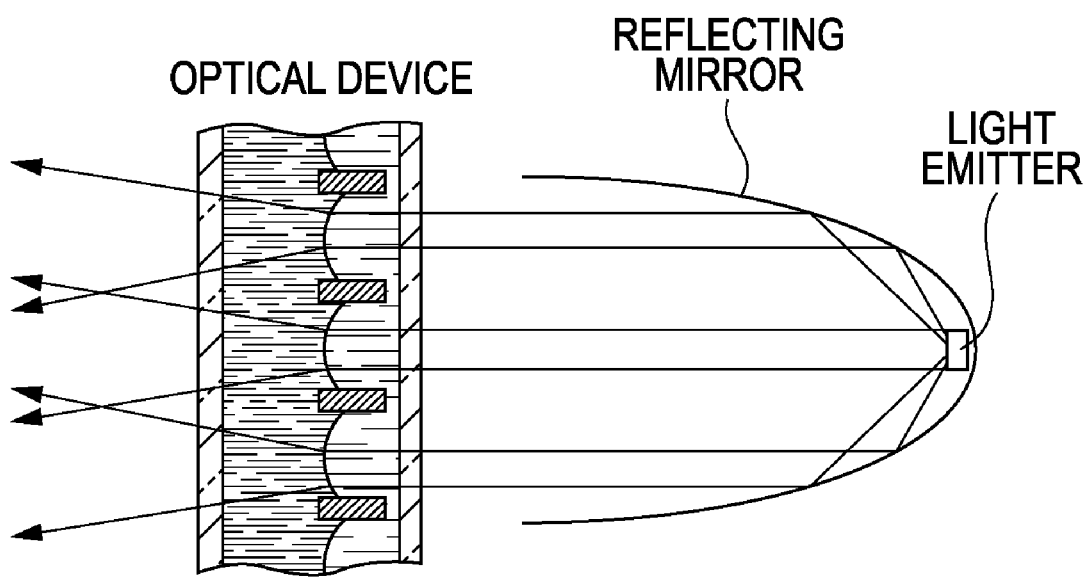

As schematically shown in FIGS. 7A and 7B, the illumination apparatus according to the first embodiment or according to a fifth embodiment to be described later includes an optical device, a light emitter formed of a xenon tube, and a reflecting mirror that reflects light emitted from the light emitter. On the other hand, the camera according to the first embodiment or according to a fifth embodiment to be described later is equipped with a stroboscopic apparatus (a so-called built-in stroboscopic apparatus) that includes an optical device, a light emitter formed of a xenon tube, and a reflecting mirror that reflects light emitted from the light emitter. The stroboscopic apparatus is, for example, contained in an upper body portion of a single-lens reflex camera.

The optical device according to the first embodiment includes a housing 10 constituted by the first sidewall member 11, the second sidewall member 12 opposed to the first sidewall member 11, the third sidewall member 13 that connects one edge of the first sidewall member 11 and one edge of the second sidewall member 12, the fourth sidewall member 14 that connects another edge of the first sidewall member 11 and another edge of the second sidewall member 12, the top plate 15 attached to the top surfaces of the first sidewall member 11, the second sidewall member 12, the third sidewall member 13, and the fourth sidewall member 14, and the bottom plate 16 attached to the bottom surfaces of the first sidewall member 11, the second sidewall member 12, the third sidewall member 13, and the fourth sidewall member 14; and (M−1) partition members 17 arranged parallel to and between the first sidewall member 11 and the second sidewall member 12.

In the optical device according to the first embodiment, m (=5) lens chambers 18 ($18_1$, $18_2$, $18_3$, $18_4$, and $18_5$) are arranged in a side-by-side manner. Each of the lens chambers 18 ($18_1$, $18_2$, $18_3$, $18_4$, and $18_5$) is filled with the first liquid 31 and the second liquid 32 that form a liquid lens serving as a columnar lens whose axis extends parallel to the direction in which the partition members 17 extend (i.e., Z-axis direction).

The first lens chamber $18_1$ is defined by the first sidewall member 11, the third sidewall member 13, the first partition member 17, the fourth sidewall member 14, the top plate 15, and the bottom plate 16. A part of the inner surface of the top plate 15 that defines the first lens chamber $18_1$ is provided with a first electrode 21, a part of the inner surface of the first sidewall member 11 that defines the first lens chamber $18_1$ is provided with a second electrode 22, and a part of the inner surface of the first partition member 17 that defines the first lens chamber $18_1$ is provided with a third electrode 23.

An (m+1)-th lens chamber $18_{(m+1)}$ is defined by an m-th (m=1, 2, ..., M−2) partition member 17, the third sidewall member 13, an (m+1)-th partition member 17, the fourth sidewall member 14, the top plate 15, and the bottom plate 16. A part of the inner surface of the top plate 15 that defines the (m+1)-th lens chamber $18_{(m+1)}$ is provided with a first electrode 21, a part of the inner surface of the m-th partition member 17 that defines the (m+1)-th lens chamber $18_{(m+1)}$ is provided with a second electrode 22, and a part of the inner surface of the (m+1)-th partition member 17 that defines the (m+1)-th lens chamber $18_{(m+1)}$ is provided with a third electrode 23.

Furthermore, an M-th lens chamber $18_M (=18_5)$ is defined by an (M−1)-th partition member 17, the third sidewall member 13, the second sidewall member 12, the fourth sidewall member 14, the top plate 15, and the bottom plate 16. A part of the inner surface of the top plate 15 that defines the M-th lens chamber $18_M (=18_5)$ is provided with a first electrode 21, a part of the inner surface of the (M−1)-th partition member 17 that defines the M-th lens chamber $18_M (=18_5)$ is provided with a second electrode 22, and a part of the inner surface of the second sidewall member 12 that defines the M-th lens chamber $18_M (=18_5)$ is provided with a third electrode 23.

Although each lens chamber is provided with a first electrode 21 in the example shown in the drawings, a single first electrode 21 may alternatively be provided over the inner surface of the top plate 15.

In the optical device according to the first embodiment, at least the first sidewall member 11, the second sidewall member 12, and the partition members 17 that are adjacent to the interface between the first liquid 31 and the second liquid 32 are given a water-repellent treatment over the surfaces thereof. The bottom surface of each partition member 17 extends to the bottom plate 16, whereas the top surface of each partition member 17 extends to the top plate 15. The housing 10 has a rectangular outer shape with longitudinal sides extending in the Z-axis direction and lateral sides extending in the Y-axis direction. Light is received from the bottom plate 16 and released from the top plate 15.

In the optical device according to the first embodiment or an optical device according to each of second to fifth embodiments to be described later, the first liquid 31 and the second liquid 32 are insoluble and unmixable with each other, and the interface between the first liquid 31 and the second liquid 32 functions as a lens surface. The first liquid 31 is electrically conductive whereas the second liquid 32 is electrically insulative. Each of the first electrodes 21 is in contact with the first liquid 31. Each of the second electrodes 22 is in contact with the first liquid 31 and the second liquid 32 through an insulating film 24. Similarly, each of the third electrodes 23 is in contact with the first liquid 31 and the second liquid 32 through an insulating film 24. The top plate 15, the bottom plate 16, and the first electrodes 21 are composed of transparent materials that can transmit light incident on the optical device.

More specifically, the top plate 15, the bottom plate 16, the first sidewall member 11, the second sidewall member 12, the third sidewall member 13, the fourth sidewall member 14, and the partition members 17 are composed of glass or a resinous material such as acrylic resin. The first liquid 31 having an electrically conductive property is composed of an aqueous solution of lithium chloride with a density of 1.06 g/cm$^3$ and a refractive index of 1.34. On the other hand, the second liquid 32 having an insulating property is composed of silicone oil TSF437 (available from Momentive Performance Materials Japan LLC (formerly called GE Toshiba Silicones Co., Ltd)) with a density of 1.02 g/cm$^3$ and a refractive index of 1.49. The first electrodes 21 are composed of an indium-tin oxide (ITO), and the second electrodes 22 and the third electrodes 23 are metallic electrodes composed of, for example, gold, aluminum, copper, or silver. The insulating films 24 are composed of a polyparaxylene or metallic oxide, such as a tantalum oxide or a titanium oxide. Each insulating film 24 has a water-repellent layer (not shown) formed thereon. Each water-repellent layer is composed of polyparaxylylene or a fluorine-based polymer. The first electrodes 21 are preferably given a hydrophilic treatment over their surfaces, whereas the third sidewall member 13 and the fourth sidewall member 14 are preferably given a water-repellent treatment over their inner surfaces. The above-described features similarly apply to an optical device according to each of second to fifth embodiments to be described later, unless otherwise noted.

The reflecting mirror is fabricated by forming a light reflecting portion (light reflecting layer) composed of, for example, aluminum, chromium, or silver on a metallic or plastic body by chemical vapor deposition (CVD) or physical vapor deposition (PVD), such as plating, vacuum deposition, or sputtering. The sectional shape of the light reflecting portion as taken along the X-Y plane of the reflecting mirror is parabolic. The light emitter is disposed at a focal point of the parabola or between the apex and the focal point of the parabola. The same applies to an optical device according to each of second to fifth embodiments to be described later.

The first electrodes 21, the second electrodes 22, and the third electrodes 23 are connected to an external control circuit via connecting portions (not shown) and each have a configuration and structure for receiving a desired voltage. When voltage is applied to the first electrode 21, the second electrode 22, and the third electrode 23 in each lens chamber, the lens surface formed by the interface between the first liquid 31 and the second liquid 32 changes from a downward convex state shown in FIG. 4A (see FIG. 7A for the emission state) to an upward convex state shown in FIG. 4B (see FIG. 7B for the emission state). The state of the lens surface changes depending on the voltage applied to the electrodes 21, 22 and 23 (see equation (A)). In the example shown in FIG. 4B, the same voltage is applied to the second electrode 22 and the third electrode 23 in each lens chamber. In this case, the sectional shape of the liquid lens, when taken along the X-Y plane, formed in each lens chamber is symmetric with respect to the optical axis of the liquid lens. On the other hand, FIG. 4C and FIGS. 5A and 5B each show a state obtained when different voltages are applied to the second electrode 22 and the third electrode 23 in each lens chamber. In this case, the sectional shape of the liquid lens, when taken along the X-Y plane, formed in each lens chamber is asymmetric with respect to the optical axis of the liquid lens. Specifically, in the state shown in FIG. 4C, the entire optical device functions as a Fresnel lens. On the other hand, in the states shown in FIGS. 5A and 5B, the optical axis of each liquid lens is shifted in the Y-axis direction, which is orthogonal to the Z-axis direction. The state shown in FIG. 4C allows for a wider light distribution angle. On the other hand, with the states shown in FIGS. 5A and 5B, the traveling direction of light emitted from the optical device can be varied. In consequence, the optical axis of the entire optical device can be shifted, and/or the inclination of the optical axis of the entire optical device can be controlled with respect to the X-axis direction. Thus, the optical power of each liquid lens can be changed in accordance with the potential difference between the second electrode 22 and the third electrode 23. In the state shown in FIG. 5A, the same voltage is applied to the second electrodes 22, and the same voltage is applied to the third electrodes 23. In contrast, in the state shown in FIG. 5B, different voltages are applied to the second electrodes 22, and different voltages are applied to the third electrodes 23, such that the entire optical device functions as a type of a Fresnel lens. When the columnar lenses exhibit their optical power as a result of voltage applied to the first electrodes 21, the second electrodes 22, and the third electrodes 23, the optical power of the columnar lenses is substantially zero in an X-Z plane (or a plane parallel to the X-Z plane), whereas the optical power of the columnar lenses is a finite value in the X-Y plane. The term "the optical axis of the entire optical device" used here is a line that connects centers of curvature of two imaginary optical surfaces of an imaginary lens obtained as the entire optical device (i.e., a single lens as the entire optical device), when viewed in cross section taken along the X-Y plane.

The second electrodes 22 are connected to a common line, and the third electrodes 23 are also connected to a common line, so that the second electrodes 22 can receive the same voltage and the third electrodes 23 can receive the same voltage. Alternatively, the second electrodes 22 may be connected to a common line, whereas the third electrodes 23 may be connected to individual lines so as to receive individually different voltages. As another alternative, the third electrodes 23 may be connected to a common line, whereas the second electrodes 22 may be connected to individual lines so as to receive individually different voltages. As a further alternative, both the second electrodes 22 and the third electrodes 23 may be connected to individual lines so as to receive individually different voltages.

The basic operation of the optical device described in the first embodiment is the same in an optical device according to each of second to fifth embodiments to be described below.

Figure 11:
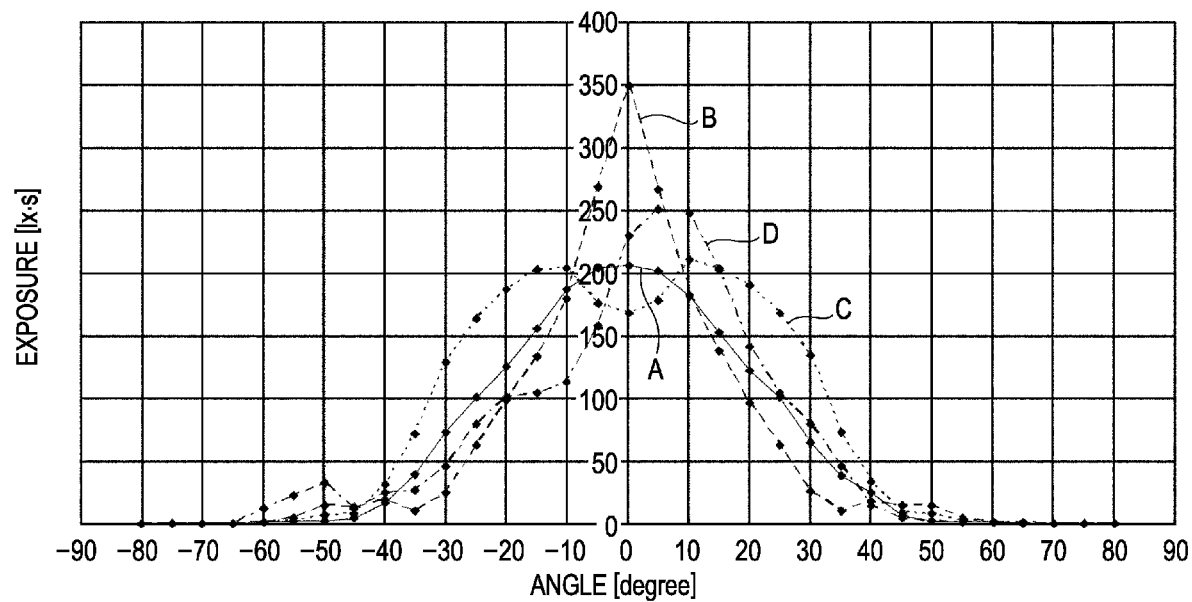
FIG. 11 is a graph showing a simulation result of light distribution obtained when columnar lenses formed of liquid lenses are changed in the illumination apparatus according to the first embodiment.
Figure 12A:
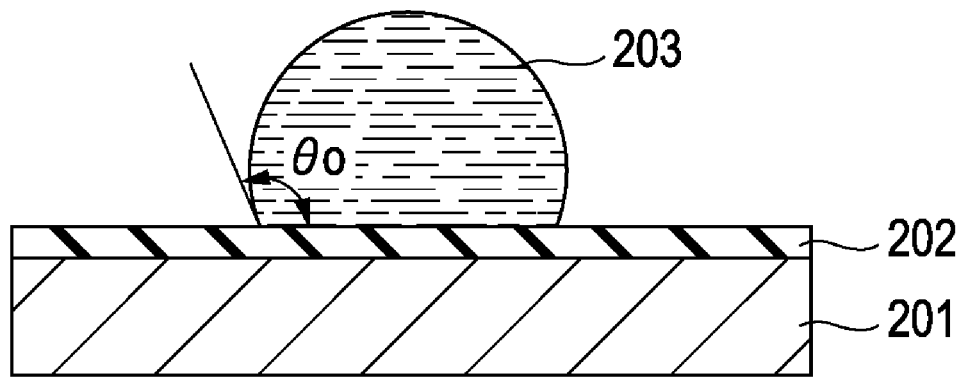
FIGS. 12A and 12B are principle diagrams illustrating an electrocapillary phenomenon.
Figure 12B:
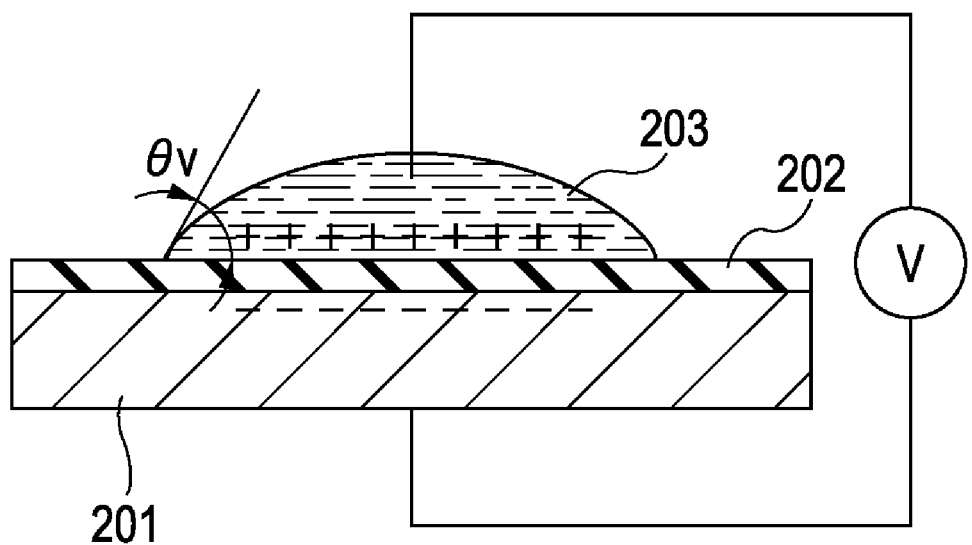

FIG. 11 shows the distribution of light in the Y-axis direction (vertical direction) obtained when the focal length of the columnar lenses formed of the liquid lenses is changed by utilizing an electrowetting phenomenon in the illumination apparatus according to the first embodiment. In FIG. 11, the light distribution shown with a curve A corresponds to the state shown in FIG. 4A (i.e., when voltage is not applied to the first electrodes 21, the second electrodes 22, and the third electrodes 23). The light distribution shown with a curve B corresponds to the state shown in FIG. 4B (i.e., when maximum voltage is applied to the first electrodes 21, the second electrodes 22, and the third electrodes 23) and indicates that the light is distributed within a narrow light distribution angle. The light distribution shown with a curve C corresponds to the state shown in FIG. 4C and indicates that the light is distributed at a wide light distribution angle since the variable rate of the guide number of the strobe light in this state is 1.6 times that of the state shown in FIG. 4A. The light distribution shown with a curve D corresponds to the state shown in FIG. 5A. In this state, the center of the light distribution angle is shifted by about 7° such that output light can be balanced without having to change the position of the optical device.

Accordingly, in the optical device according to the first embodiment, the light distribution state is changeable by utilizing an electrowetting phenomenon. In addition, the voltage applied to the second electrode 22 and the voltage applied to the third electrode 23 in each lens chamber can be controlled independently of each other. Consequently, a high optical power can be obtained, the light distribution state can be controlled independently in multiple directions, and the optical power can be adjusted to various levels. Moreover, for example, the optical axis of the entire optical device can be shifted, and the inclination of the optical axis can be controlled. Accordingly, with simple control, the light distribution angle of light emitted from the optical device can be increased towards the wide-angle end or reduced towards the telephoto end. Furthermore, the optical device according to the first embodiment allows for simple control of the focus position of light emitted from the optical device, simple compensation for an installation error of the illumination apparatus, and simple compensation for a manufacturing variation of the illumination apparatus.

Second Embodiment

Figure 6A:
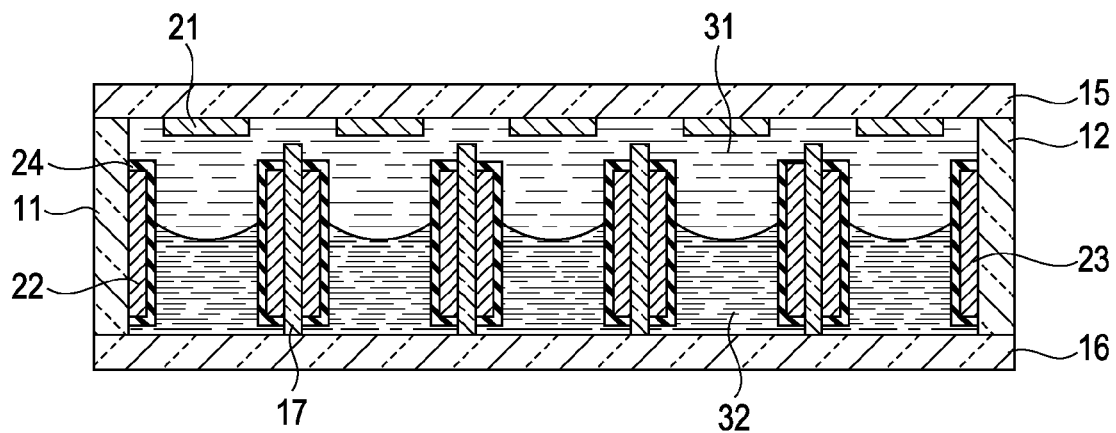
FIGS. 6A to 6C are schematic cross-sectional views similar to that taken along line C-C in FIG. 3 and respectively illustrate optical devices according to a second embodiment, a third embodiment, and a fourth embodiment.
Figure 6B:
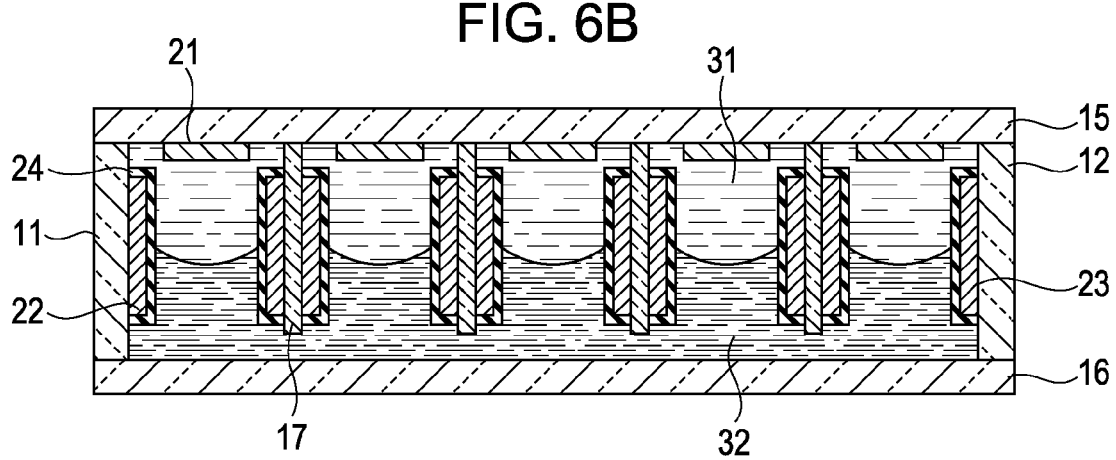
Figure 6C:
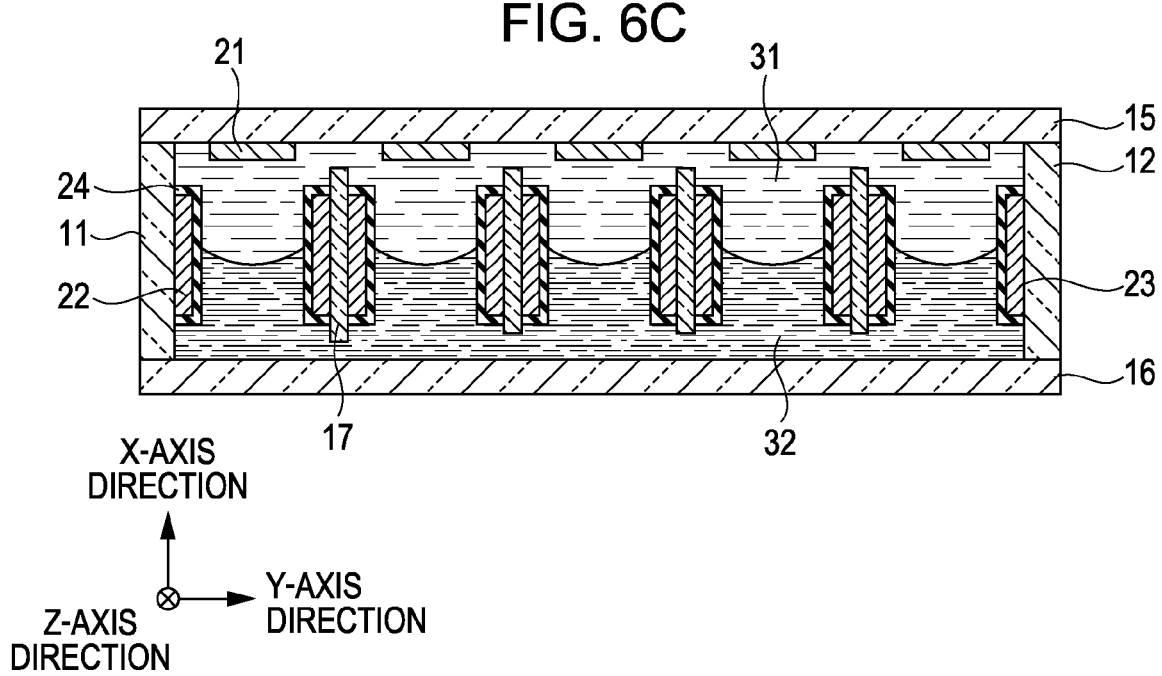

A second embodiment is a modification of the first embodiment and relates to the first-B configuration. As shown in a schematic cross-sectional view in FIG. 6A, in an optical device according to the second embodiment, the bottom surface of each partition member 17 extends to the bottom plate 16, whereas the top surface of each partition member 17 and the top plate 15 have a gap therebetween. FIG. 6A and FIGS. 6B and 6C to be described below are schematic cross-sectional views similar to that taken along line C-C in FIG. 3. Other than these features, the optical device, an illumination apparatus, and a camera according to the second embodiment are substantially the same as the optical device, the illumination apparatus, and the camera according to the first embodiment, and therefore, detailed descriptions thereof will be omitted here.

Third Embodiment

A third embodiment is also a modification of the first embodiment and relates to the first-C configuration. As shown in the schematic cross-sectional view in FIG. 6B, in an optical device according to the third embodiment, the bottom surface of each partition member 17 and the bottom plate 16 have a gap therebetween, whereas the top surface of each partition member 17 extends to the top plate 15. Other than these features, the optical device, an illumination apparatus, and a camera according to the third embodiment are substantially the same as the optical device, the illumination apparatus, and the camera according to the first embodiment, and therefore, detailed descriptions thereof will be omitted here.

Fourth Embodiment

A fourth embodiment is also a modification of the first embodiment and relates to the first-D configuration. As shown in the schematic cross-sectional view in FIG. 6C, in an optical device according to the fourth embodiment, the bottom surface of each partition member 17 and the bottom plate 16 have a gap therebetween, and the top surface of each partition member 17 and the top plate 15 also have a gap therebetween. Other than these features, the optical device, an illumination apparatus, and a camera according to the fourth embodiment are substantially the same as the optical device, the illumination apparatus, and the camera according to the first embodiment, and therefore, detailed descriptions thereof will be omitted here.

Fifth Embodiment

Figure 8:
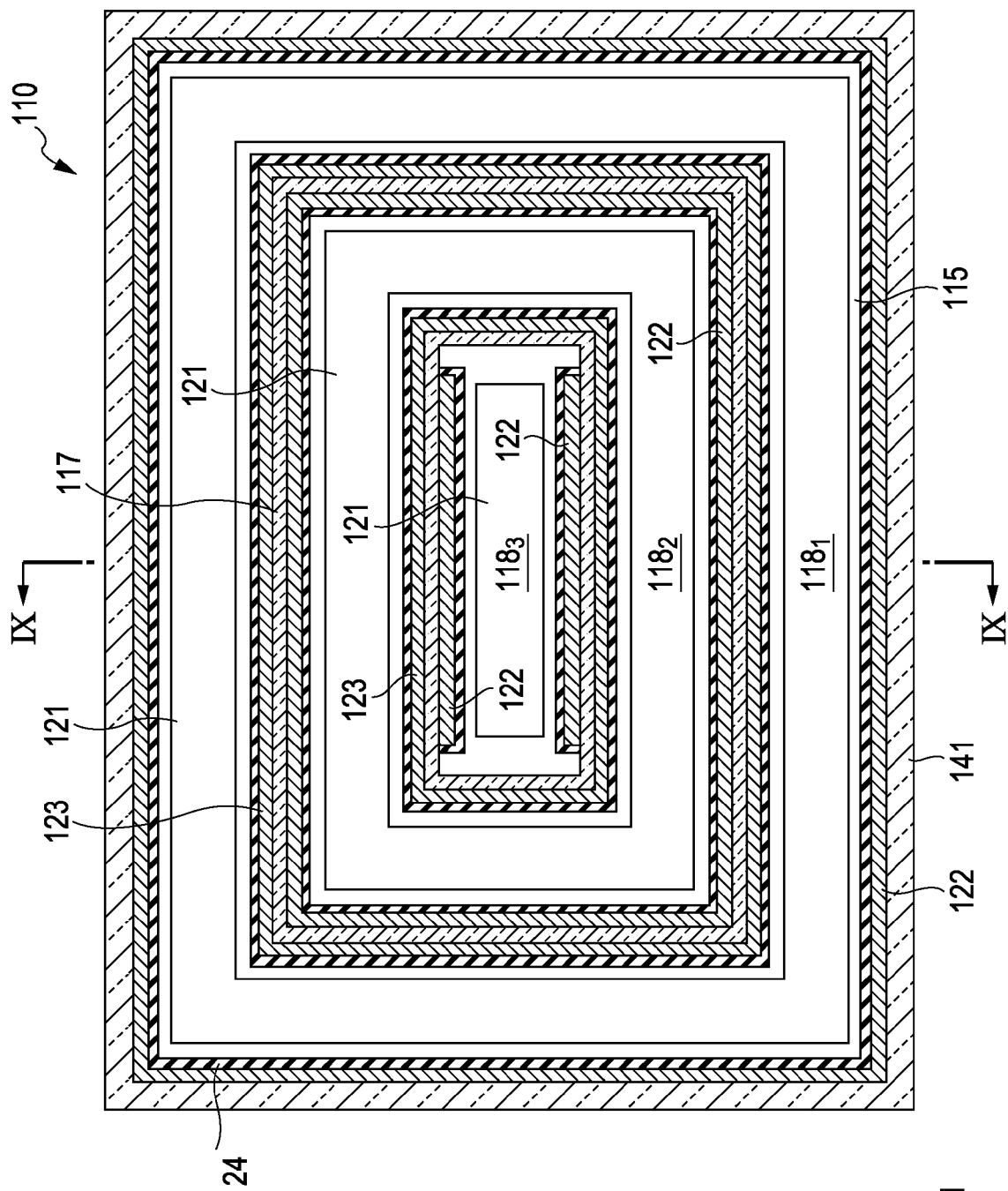
FIG. 8 is a schematic cross-sectional view similar to that taken along line A-A in FIG. 1B and illustrates an optical device according to a fifth embodiment.
Figure 8:
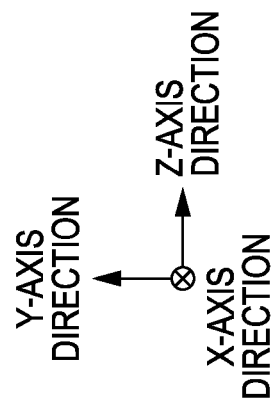
Figure 9:
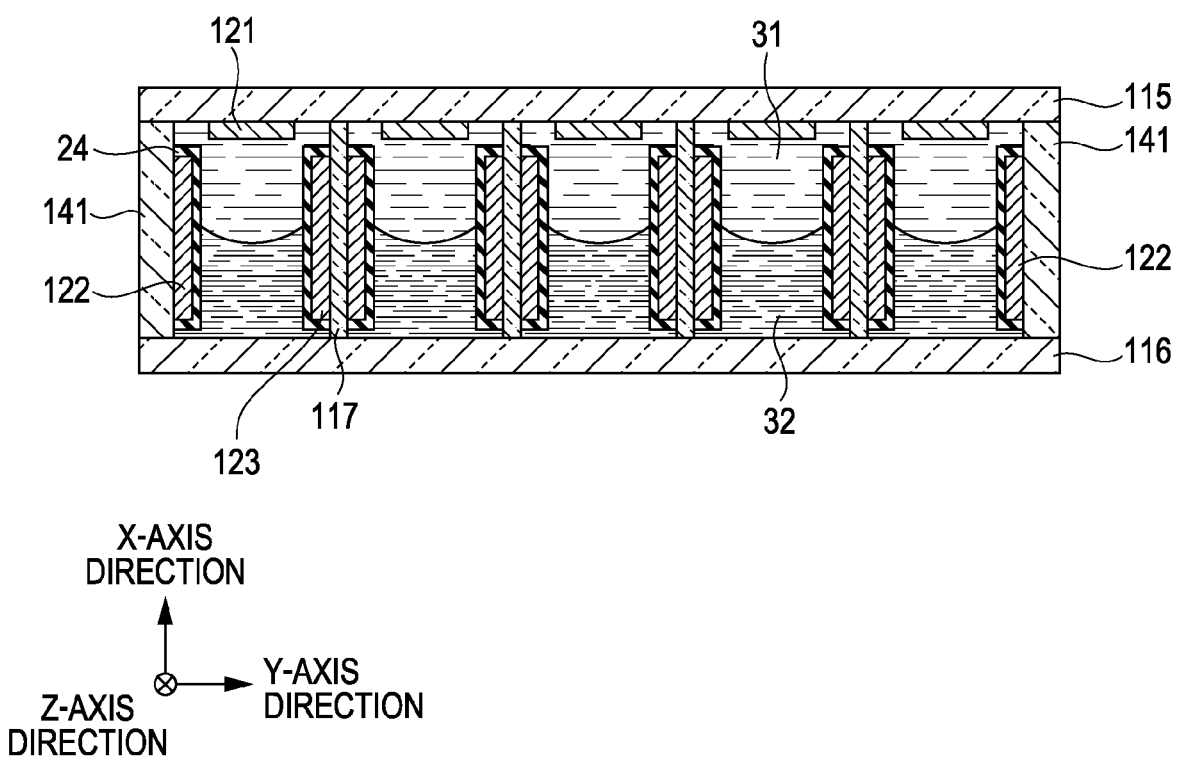
FIG. 9 is a schematic cross-sectional view of the optical device according to the fifth embodiment, as taken along line IX-IX in FIG. 8.

An optical device, an illumination apparatus, and a camera according to a fifth embodiment specifically relates to the second-A configuration. FIGS. 8 and 9 are schematic cross-sectional views of the optical device according to the fifth embodiment. Specifically, FIG. 8 is a schematic cross-sectional view similar to that taken along line A-A in FIG. 1B. FIG. 9 is a schematic cross-sectional view taken along line IX-IX in FIG. 8.

The optical device according to the fifth embodiment includes a housing 110 constituted by a so-called endless outer wall member 141 having no ends, a top plate 115 attached to a top surface of the outer wall member 141, and a bottom plate 116 attached to a bottom surface of the outer wall member 141; and (N−1) partition members 117 having no ends and disposed concentrically with the outer wall member 141.

The optical device has (N−1) annular lens chambers as well as a central lens chamber surrounded by the (N−1)-th partition member 117. In the fifth embodiment, N=3. Each of lens chambers 118 ($118_1$, $118_2$, and $118_3$) is filled with the first liquid 31 and the second liquid 32 that form a liquid lens.

The first lens chamber (annular lens chamber) $118_1$ is defined by the outer wall member 141, the first partition member 117, the top plate 115, and the bottom plate 116. A part of the inner surface of the top plate 115 that defines the first lens chamber $118_1$ is provided with a first electrode 121, a part of the inner surface of the outer wall member 141 that defines the first lens chamber $118_1$ is provided with a second electrode 122, and a part of the inner surface of the first partition member 117 that defines the first lens chamber $118_1$ is provided with a third electrode 123.

An (n+1)-th lens chamber (annular lens chamber) $118_{(n+1)}$ is defined by an n-th (n=1, 2, ..., N−2) partition member 117, an (n+1)-th partition member 117, the top plate 115, and the bottom plate 116. A part of the inner surface of the top plate 115 that defines the (n+1)-th lens chamber $118_{(n+1)}$ is provided with a first electrode 121, a part of the inner surface of the n-th partition member 117 that defines the (n+1)-th lens chamber $118_{(n+1)}$ is provided with a second electrode 122, and a part of the inner surface of the (n+1)-th partition member 117 that defines the (n+1)-th lens chamber $118_{(n+1)}$ is provided with a third electrode 123.

A part of the inner surface of the top plate 115 that defines the central lens chamber $118_3$, which is equivalent to an N-th lens chamber $118_N$, is provided with a first electrode 121, and a part of the inner surface of the (N−1)-th partition member 117 that defines the central lens chamber $118_3$ is provided with a second electrode 122 in the fifth embodiment.

Although each lens chamber is provided with a first electrode 121 in the example shown in the drawings, a single first electrode 121 may be provided over the inner surface of the top plate 115.

In the optical device according to the fifth embodiment, at least the outer wall member 141 and the partition members 117 that are adjacent to the interface between the first liquid 31 and the second liquid 32 are given a water-repellent treatment over the surfaces thereof, as in the first embodiment. Furthermore, similar to the first embodiment, the bottom surface of each partition member 117 extends to the bottom plate 116, whereas the top surface of each partition member 117 extends to the top plate 115. The housing 110 has a rectangular outer shape with longitudinal sides extending in the Z-axis direction and lateral sides extending in the Y-axis direction. Light is received from the bottom plate 116 and released from the top plate 115.

The optical device according to the fifth embodiment is similar to that in the first embodiment in that, in each of the lens chambers $118_1$, $118_2$, and $118_3$, the optical power of the liquid lens can be changed by applying different voltages to the second electrode 122 and the third electrode 123. Furthermore, by applying different voltages to the second electrode 122 and the third electrode 123 in each of the lens chambers $118_1$, $118_2$, and $118_3$, the entire optical device can function as a Fresnel lens.

The fifth embodiment may employ the second-B configuration as a modification thereof, like the second embodiment. In that case, the bottom surface of each partition member 117 extends to the bottom plate 116, whereas the top surface of each partition member 117 and the top plate 115 have a gap therebetween. Alternatively, the fifth embodiment may employ the second-C configuration as a modification thereof, like the third embodiment. In that case, the bottom surface of each partition member 117 and the bottom plate 116 have a gap therebetween, whereas the top surface of each partition member 117 extends to the top plate 115. As another alternative, the fifth embodiment may employ the second-D configuration as a modification thereof, like the fourth embodiment. In that case, the bottom surface of each partition member 117 and the bottom plate 116 have a gap therebetween, and the top surface of each partition member 117 and the top plate 115 also have a gap therebetween. As a further alternative, for example, the second electrodes 122 and the third electrodes 123 may partially be omitted from parts of the outer wall member 141 and the partition members 117 that extend parallel to the Y-axis direction.

Figure 10:
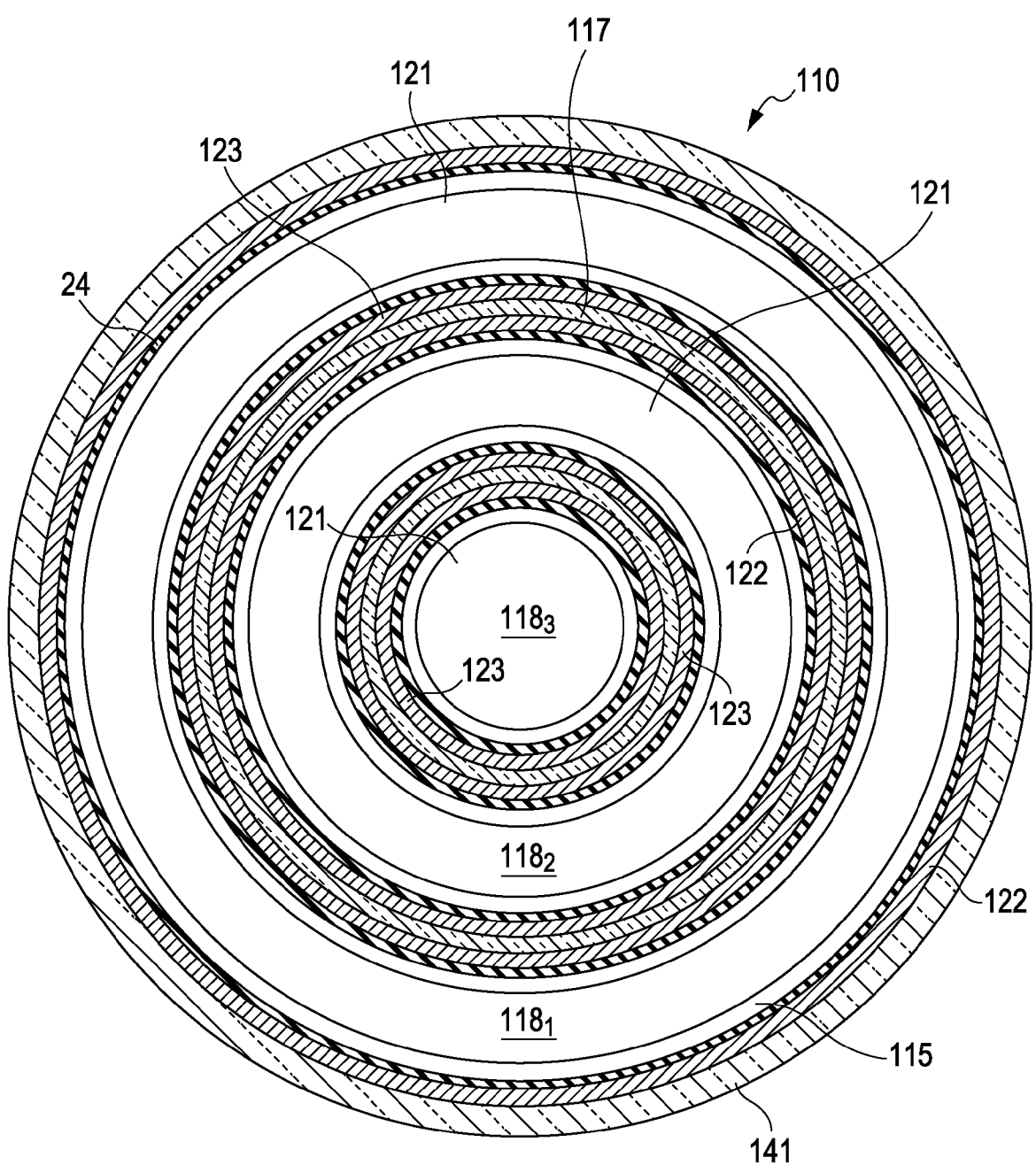
FIG. 10 is a schematic cross-sectional view similar to that taken along line A-A in FIG. 1B and illustrates a modification of the optical device according to the fifth embodiment.

FIG. 10 illustrates a modification of the optical device according to the fifth embodiment. FIG. 10 is a schematic cross-sectional view of this modification, as taken along line A-A in FIG. 1B. In this modification, the housing 110 has a circular outer shape. A part of the inner surface of the (N−1)-th partition member 117 that defines the central lens chamber $118_3$, which is equivalent to the N-th lens chamber $118_N$, is provided with a third electrode 123.

For example, the optical device described in the fourth embodiment can be fabricated based on the following method.

First, the first sidewall member 11, the second sidewall member 12, the third sidewall member 13, the fourth sidewall member 14, the top plate 15, the bottom plate 16, and the partition members 17 are fabricated. The second sidewall member 12 and the fourth sidewall member 14 are preliminarily provided with an inlet to be used for liquid injection and an outlet to be used for liquid drainage. Subsequently, the first sidewall member 11, the second sidewall member 12, the third sidewall member 13, the fourth sidewall member 14, the bottom plate 16, and the partition members 17 are joined to one another by using, for example, an adhesive. Then, the second electrodes 22 and the third electrodes 23 are formed on the first sidewall member 11, the third sidewall member 13, and the partition members 17 by, for example, sputtering or plating. On the other hand, the first electrode or electrodes 21 are formed on the top plate 15 by, for example, sputtering or plating before the top plate 15 is fixed to the sidewall members 11, 12, 13, and 14.

Subsequently, while reducing the pressure in each of the lens chambers 18, the second liquid 32 is injected through the inlet (not shown) provided in the second sidewall member 12, and then the first liquid 31 is injected through the inlet. In this case, the first liquid 31 is injected while it forms an interface with the second liquid 32. At the same time, a portion of the second liquid 32 is drained from the outlet (not shown). Finally, the inlet and the outlet are sealed, and the electrodes are connected to an external control circuit, whereby the fabrication of the optical device is completed.

The optical devices described in the other embodiments can be fabricated substantially by the same method.

Although preferred embodiments have been described above, the present invention is not limited to these embodiments. The configuration and the structure of the optical device and the illumination apparatus (stroboscopic apparatus) described in the above embodiments are examples, and the materials used for forming the optical device are also examples, and may be changed where necessary. Furthermore, the configuration, the structure, and the arrangement of the first electrodes, the second electrodes, and the third electrodes are changeable where necessary, depending on the properties (electrically conductive and insulating properties) of the liquids with which these electrodes come in contact directly or through insulating films. The definition of the top plate and the bottom plate in the optical device according to each embodiment is relative, meaning that the top plate may alternatively be referred to as a first light transmitting member and the bottom plate may alternatively be referred to as a second light transmitting member.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention is claimed as follows:

1. An optical device comprising:
    a housing that has
    a first sidewall member,
    a second sidewall member opposed to the first sidewall member,
    a third sidewall member that connects one edge of the first sidewall member and one edge of the second sidewall member,
    a fourth sidewall member that connects another edge of the first sidewall member and another edge of the second sidewall member,
    a top plate attached to top surfaces of the first sidewall member, the second sidewall member, the third sidewall member, and the fourth sidewall member, and
    a bottom plate attached to bottom surfaces of the first sidewall member, the second sidewall member, the third sidewall member, and the fourth sidewall member; and
    (M−1) partition members arranged parallel to and between the first sidewall member and the second sidewall member,
    wherein M lens chambers are arranged in a side-by-side manner,
    wherein each lens chamber is filled with a first liquid and a second liquid that form a liquid lens functioning as a columnar lens whose axis extends parallel to a direction in which the partition members extend,
    wherein a first lens chamber is defined by the first sidewall member, the third sidewall member, a first partition member, the fourth sidewall member, the top plate, and the bottom plate,
    wherein a part of an inner surface of the top plate that defines the first lens chamber is provided with a first electrode,
    wherein a part of an inner surface of the first sidewall member that defines the first lens chamber is provided with a second electrode, and
    wherein a part of an inner surface of the first partition member that defines the first lens chamber is provided with a third electrode,
    wherein an (m+1)-th lens chamber is defined by an m-th partition member, the third sidewall member, an (m+1)-th partition member, the fourth sidewall member, the top plate, and the bottom plate, m being equal to 1, 2, . . . , or M−2,
    wherein a part of the inner surface of the top plate that defines the (m+1)-th lens chamber is provided with a first electrode,
    wherein a part of an inner surface of the m-th partition member that defines the (m+1)-th lens chamber is provided with a second electrode, and
    wherein a part of an inner surface of the (m+1)-th partition member that defines the (m+1)-th lens chamber is provided with a third electrode, and
    wherein an M-th lens chamber is defined by an (M−1)-th partition member, the third sidewall member, the second sidewall member, the fourth sidewall member, the top plate, and the bottom plate,
    wherein a part of the inner surface of the top plate that defines the M-th lens chamber is provided with a first electrode,
    wherein a part of an inner surface of the (M−1)-th partition member that defines the M-th lens chamber is provided with a second electrode, and
    wherein a part of an inner surface of the second sidewall member that defines the M-th lens chamber is provided with a third electrode.

2. The optical device according to claim 1, wherein at least a surface of each of the first sidewall member, the second sidewall member, and the partition members that are adjacent to an interface between the first liquid and the second liquid is given a water-repellent treatment.

3. The optical device according to claim 1, wherein a bottom surface of each partition member extends to the bottom plate, and
    wherein a top surface of each partition member extends to the top plate.

4. The optical device according to claim 1, wherein a bottom surface of each partition member extends to the bottom plate, and
    wherein a top surface of each partition member and the top plate have a gap therebetween.

5. The optical device according to claim 1, wherein a bottom surface of each partition member and the bottom plate have a gap therebetween, and
    wherein a top surface of each partition member extends to the top plate.

6. The optical device according to claim 1, wherein a bottom surface of each partition member and the bottom plate have a gap therebetween, and
    wherein a top surface of each partition member and the top plate have a gap therebetween.

7. The optical device according to claim 1, wherein the first liquid and the second liquid are insoluble and unmixable with each other so that an interface between the first liquid and the second liquid functions as a lens surface.

8. The optical device according to claim 1, wherein the first liquid has an electrically conductive property and the second liquid has an insulating property,
    wherein each first electrode is in contact with the first liquid,
    wherein each second electrode is in contact with the first liquid and the second liquid through an insulating film, and
    wherein each third electrode is in contact with the first liquid and the second liquid through an insulating film.

9. The optical device according to claim 1, wherein the top plate, the bottom plate, and the first electrodes are each composed of a transparent material that transmits light incident on the optical device.

10. The optical device according to claim 1, wherein different voltages are applied to the second electrode and the third electrode in each lens chamber so as to change an optical power of the liquid lens functioning as the columnar lens and to shift an optical axis of the liquid lens functioning as the columnar lens in a direction orthogonal to the optical axis.

11. The optical device according to claim 1, wherein different voltages are applied to the second electrode and the third electrode in each lens chamber so as to allow the entire optical device to function as a Fresnel lens.

12. An optical device comprising:
    a housing that has
    an outer wall member having no ends,
    a top plate attached to a top surface of the outer wall member, and
    a bottom plate attached to a bottom surface of the outer wall member; and
    (N−1) partition members having no ends and disposed concentrically with the outer wall member,
    wherein the optical device has (N−1) annular lens chambers and a central lens chamber surrounded by an (N−1)-th partition member,
    wherein each lens chamber is filled with a first liquid and a second liquid that form a liquid lens, wherein a first lens chamber is defined by the outer wall member, a first partition member, the top plate, and the bottom plate, wherein a part of an inner surface of the top plate that defines the first lens chamber is provided with a first electrode, wherein a part of an inner surface of the outer wall member that defines the first lens chamber is provided with a second electrode, and wherein a part of an inner surface of the first partition member that defines the first lens chamber is provided with a third electrode, wherein an (n+1)-th lens chamber is defined by an n-th partition member, an (n+1)-th partition member, the top plate, and the bottom plate, n being equal to 1, 2, . . . , or N−2, wherein a part of the inner surface of the top plate that defines the (n+1)-th lens chamber is provided with a first electrode, wherein a part of an inner surface of the n-th partition member that defines the (n+1)-th lens chamber is provided with a second electrode, and wherein a part of an inner surface of the (n+1)-th partition member that defines the (n+1)-th lens chamber is provided with a third electrode, and wherein a part of the inner surface of the top plate that defines the central lens chamber, which is equivalent to an N-th lens chamber, is provided with a first electrode, and wherein a part of an inner surface of the (N−1)-th partition member that defines the central lens chamber is provided with a second electrode or a third electrode.

13. The optical device according to claim 12, wherein at least a surface of each of the outer wall member and the partition members that are adjacent to an interface between the first liquid and the second liquid is given a water-repellent treatment.

14. The optical device according to claim 12, wherein a bottom surface of each partition member extends to the bottom plate, and
wherein a top surface of each partition member extends to the top plate.

15. The optical device according to claim 12, wherein a bottom surface of each partition member extends to the bottom plate, and
wherein a top surface of each partition member and the top plate have a gap therebetween.

16. The optical device according to claim 12, wherein a bottom surface of each partition member and the bottom plate have a gap therebetween, and
wherein a top surface of each partition member extends to the top plate.

17. The optical device according to claim 12, wherein a bottom surface of each partition member and the bottom plate have a gap therebetween, and
wherein a top surface of each partition member and the top plate have a gap therebetween.

18. The optical device according to claim 12, wherein the first liquid and the second liquid are insoluble and unmixable with each other so that an interface between the first liquid and the second liquid functions as a lens surface.

19. The optical device according to claim 12, wherein the first liquid has an electrically conductive property and the second liquid has an insulating property,
wherein each first electrode is in contact with the first liquid,
wherein each second electrode is in contact with the first liquid and the second liquid through an insulating film, and
wherein each third electrode is in contact with the first liquid and the second liquid through an insulating film.

20. The optical device according to claim 12, wherein the top plate, the bottom plate, and the first electrodes are each composed of a transparent material that transmits light incident on the optical device.

21. The optical device according to claim 12, wherein different voltages are applied to the second electrode and the third electrode in each lens chamber so as to change an optical power of the liquid lens.

22. The optical device according to claim 12, wherein different voltages are applied to the second electrode and the third electrode in each lens chamber so as to allow the entire optical device to function as a Fresnel lens.

23. An illumination apparatus comprising:
an optical device;
light-emitting means; and
a reflecting mirror that reflects light emitted from the light-emitting means,
wherein the optical device includes
a housing that has
a first sidewall member,
a second sidewall member opposed to the first sidewall member,
a third sidewall member that connects one edge of the first sidewall member and one edge of the second sidewall member,
a fourth sidewall member that connects another edge of the first sidewall member and another edge of the second sidewall member,
a top plate attached to top surfaces of the first sidewall member, the second sidewall member, the third sidewall member, and the fourth sidewall member, and
a bottom plate attached to bottom surfaces of the first sidewall member, the second sidewall member, the third sidewall member, and the fourth sidewall member, and
(M−1) partition members arranged parallel to and between the first sidewall member and the second sidewall member,
wherein M lens chambers are arranged in a side-by-side manner,
wherein each lens chamber is filled with a first liquid and a second liquid that form a liquid lens functioning as a columnar lens whose axis extends parallel to a direction in which the partition members extend,
wherein a first lens chamber is defined by the first sidewall member, the third sidewall member, a first partition member, the fourth sidewall member, the top plate, and the bottom plate,
wherein a part of an inner surface of the top plate that defines the first lens chamber is provided with a first electrode,
wherein a part of an inner surface of the first sidewall member that defines the first lens chamber is provided with a second electrode, and
wherein a part of an inner surface of the first partition member that defines the first lens chamber is provided with a third electrode,
wherein an (m+1)-th lens chamber is defined by an m-th partition member, the third sidewall member, an (m+1)-th partition member, the fourth sidewall member, the top plate, and the bottom plate, m being equal to 1, 2, . . . , or M−2, wherein a part of the inner surface of the top plate that defines the (m+1)-th lens chamber is provided with a first electrode, wherein a part of an inner surface of the m-th partition member that defines the (m+1)-th lens chamber is provided with a second electrode, and wherein a part of an inner surface of the (m+1)-th partition member that defines the (m+1)-th lens chamber is provided with a third electrode, and wherein an M-th lens chamber is defined by an (M−1)-th partition member, the third sidewall member, the second sidewall member, the fourth sidewall member, the top plate, and the bottom plate, wherein a part of the inner surface of the top plate that defines the M-th lens chamber is provided with a first electrode, wherein a part of an inner surface of the (M−1)-th partition member that defines the M-th lens chamber is provided with a second electrode, and wherein a part of an inner surface of the second sidewall member that defines the M-th lens chamber is provided with a third electrode.

24. An illumination apparatus comprising:
an optical device;
light-emitting means; and
a reflecting mirror that reflects light emitted from the light-emitting means,
wherein the optical device includes
a housing that has
an outer wall member having no ends,
a top plate attached to a top surface of the outer wall member, and
a bottom plate attached to a bottom surface of the outer wall member; and
(N−1) partition members having no ends and disposed concentrically with the outer wall member,
wherein the optical device has (N−1) annular lens chambers and a central lens chamber surrounded by an (N−1)-th partition member,
wherein each lens chamber is filled with a first liquid and a second liquid that form a liquid lens,
wherein a first lens chamber is defined by the outer wall member, a first partition member, the top plate, and the bottom plate,
wherein a part of an inner surface of the top plate that defines the first lens chamber is provided with a first electrode,
wherein a part of an inner surface of the outer wall member that defines the first lens chamber is provided with a second electrode, and
wherein a part of an inner surface of the first partition member that defines the first lens chamber is provided with a third electrode,
wherein an (n+1)-th lens chamber is defined by an n-th partition member, an (n+1)-th partition member, the top plate, and the bottom plate, n being equal to 1, 2, . . . , or N−2,
wherein a part of the inner surface of the top plate that defines the (n+1)-th lens chamber is provided with a first electrode,
wherein a part of an inner surface of the n-th partition member that defines the (n+1)-th lens chamber is provided with a second electrode, and
wherein a part of an inner surface of the (n+1)-th partition member that defines the (n+1)-th lens chamber is provided with a third electrode, and wherein a part of the inner surface of the top plate that defines the central lens chamber, which is equivalent to an N-th lens chamber, is provided with a first electrode, and wherein a part of an inner surface of the (N−1)-th partition member that defines the central lens chamber is provided with a second electrode or a third electrode.

25. A camera having a stroboscopic apparatus, the stroboscopic apparatus comprising:
an optical device;
light-emitting means; and
a reflecting mirror that reflects light emitted from the light-emitting means,
wherein the optical device included in the stroboscopic apparatus includes
a housing that has
a first sidewall member,
a second sidewall member opposed to the first sidewall member,
a third sidewall member that connects one edge of the first sidewall member and one edge of the second sidewall member,
a fourth sidewall member that connects another edge of the first sidewall member and another edge of the second sidewall member,
a top plate attached to top surfaces of the first sidewall member, the second sidewall member, the third sidewall member, and the fourth sidewall member, and
a bottom plate attached to bottom surfaces of the first sidewall member, the second sidewall member, the third sidewall member, and the fourth sidewall member, and
(M−1) partition members arranged parallel to and between the first sidewall member and the second sidewall member,
wherein M lens chambers are arranged in a side-by-side manner,
wherein each lens chamber is filled with a first liquid and a second liquid that form a liquid lens functioning as a columnar lens whose axis extends parallel to a direction in which the partition members extend,
wherein a first lens chamber is defined by the first sidewall member, the third sidewall member, a first partition member, the fourth sidewall member, the top plate, and the bottom plate,
wherein a part of an inner surface of the top plate that defines the first lens chamber is provided with a first electrode,
wherein a part of an inner surface of the first sidewall member that defines the first lens chamber is provided with a second electrode, and
wherein a part of an inner surface of the first partition member that defines the first lens chamber is provided with a third electrode,
wherein an (m+1)-th lens chamber is defined by an m-th partition member, the third sidewall member, an (m+1)-th partition member, the fourth sidewall member, the top plate, and the bottom plate, m being equal to 1, 2, . . . , or M−2,
wherein a part of the inner surface of the top plate that defines the (m+1)-th lens chamber is provided with a first electrode,
wherein a part of an inner surface of the m-th partition member that defines the (m+1)-th lens chamber is provided with a second electrode, and
wherein a part of an inner surface of the (m+1)-th partition member that defines the (m+1)-th lens chamber is provided with a third electrode, and wherein an M-th lens chamber is defined by an (M−1)-th partition member, the third sidewall member, the second sidewall member, the fourth sidewall member, the top plate, and the bottom plate, wherein a part of the inner surface of the top plate that defines the M-th lens chamber is provided with a first electrode, wherein a part of an inner surface of the (M−1)-th partition member that defines the M-th lens chamber is provided with a second electrode, and wherein a part of an inner surface of the second sidewall member that defines the M-th lens chamber is provided with a third electrode.

26. A camera having a stroboscopic apparatus, the stroboscopic apparatus comprising:

an optical device;

light-emitting means; and a reflecting mirror that reflects light emitted from the light-emitting means, wherein the optical device included in the stroboscopic apparatus includes a housing that has an outer wall member having no ends, a top plate attached to a top surface of the outer wall member, and a bottom plate attached to a bottom surface of the outer wall member; and (N−1) partition members having no ends and disposed concentrically with the outer wall member, wherein the optical device has (N−1) annular lens chambers and a central lens chamber surrounded by an (N−1)-th partition member, wherein each lens chamber is filled with a first liquid and a second liquid that form a liquid lens, wherein a first lens chamber is defined by the outer wall member, a first partition member, the top plate, and the bottom plate, wherein a part of an inner surface of the top plate that defines the first lens chamber is provided with a first electrode, wherein a part of an inner surface of the outer wall member that defines the first lens chamber is provided with a second electrode, and wherein a part of an inner surface of the first partition member that defines the first lens chamber is provided with a third electrode, wherein an (n+1)-th lens chamber is defined by an n-th partition member, an (n+1)-th partition member, the top plate, and the bottom plate, n being equal to 1, 2, . . . , or N−2, wherein a part of the inner surface of the top plate that defines the (n+1)-th lens chamber is provided with a first electrode, wherein a part of an inner surface of the n-th partition member that defines the (n+1)-th lens chamber is provided with a second electrode, and wherein a part of an inner surface of the (n+1)-th partition member that defines the (n+1)-th lens chamber is provided with a third electrode, and wherein a part of the inner surface of the top plate that defines the central lens chamber, which is equivalent to an N-th lens chamber, is provided with a first electrode, and wherein a part of an inner surface of the (N−1)-th partition member that defines the central lens chamber is provided with a second electrode or a third electrode.

27. An illumination apparatus comprising:

an optical device;

a light emitter; and a reflecting mirror that reflects light emitted from the light emitter, wherein the optical device includes a housing that has a first sidewall member, a second sidewall member opposed to the first sidewall member, a third sidewall member that connects one edge of the first sidewall member and one edge of the second sidewall member, a fourth sidewall member that connects another edge of the first sidewall member and another edge of the second sidewall member, a top plate attached to top surfaces of the first sidewall member, the second sidewall member, the third sidewall member, and the fourth sidewall member, and a bottom plate attached to bottom surfaces of the first sidewall member, the second sidewall member, the third sidewall member, and the fourth sidewall member, and (M−1) partition members arranged parallel to and between the first sidewall member and the second sidewall member, wherein M lens chambers are arranged in a side-by-side manner, wherein each lens chamber is filled with a first liquid and a second liquid that form a liquid lens functioning as a columnar lens whose axis extends parallel to a direction in which the partition members extend, wherein a first lens chamber is defined by the first sidewall member, the third sidewall member, a first partition member, the fourth sidewall member, the top plate, and the bottom plate, wherein a part of an inner surface of the top plate that defines the first lens chamber is provided with a first electrode, wherein a part of an inner surface of the first sidewall member that defines the first lens chamber is provided with a second electrode, and wherein a part of an inner surface of the first partition member that defines the first lens chamber is provided with a third electrode, wherein an (m+1)-th lens chamber is defined by an m-th partition member, the third sidewall member, an (m+1)-th partition member, the fourth sidewall member, the top plate, and the bottom plate, m being equal to 1, 2, . . . , or M−2, wherein a part of the inner surface of the top plate that defines the (m+1)-th lens chamber is provided with a first electrode, wherein a part of an inner surface of the m-th partition member that defines the (m+1)-th lens chamber is provided with a second electrode, and wherein a part of an inner surface of the (m+1)-th partition member that defines the (m+1)-th lens chamber is provided with a third electrode, and wherein an M-th lens chamber is defined by an (M−1)-th partition member, the third sidewall member, the second sidewall member, the fourth sidewall member, the top plate, and the bottom plate, wherein a part of the inner surface of the top plate that defines the M-th lens chamber is provided with a first electrode, wherein a part of an inner surface of the (M−1)-th partition member that defines the M-th lens chamber is provided with a second electrode, and wherein a part of an inner surface of the second sidewall member that defines the M-th lens chamber is provided with a third electrode.

28. An illumination apparatus comprising:
an optical device;
a light emitter; and
a reflecting mirror that reflects light emitted from the light emitter,
wherein the optical device includes
a housing that has
an outer wall member having no ends,
a top plate attached to a top surface of the outer wall member, and
a bottom plate attached to a bottom surface of the outer wall member; and
(N−1) partition members having no ends and disposed concentrically with the outer wall member,
wherein the optical device has (N−1) annular lens chambers and a central lens chamber surrounded by an (N−1)-th partition member,
wherein each lens chamber is filled with a first liquid and a second liquid that form a liquid lens,
wherein a first lens chamber is defined by the outer wall member, a first partition member, the top plate, and the bottom plate,
wherein a part of an inner surface of the top plate that defines the first lens chamber is provided with a first electrode,
wherein a part of an inner surface of the outer wall member that defines the first lens chamber is provided with a second electrode, and
wherein a part of an inner surface of the first partition member that defines the first lens chamber is provided with a third electrode,
wherein an (n+1)-th lens chamber is defined by an n-th partition member, an (n+1)-th partition member, the top plate, and the bottom plate, n being equal to 1, 2, . . . , or N−2,
wherein a part of the inner surface of the top plate that defines the (n+1)-th lens chamber is provided with a first electrode,
wherein a part of an inner surface of the n-th partition member that defines the (n+1)-th lens chamber is provided with a second electrode, and
wherein a part of an inner surface of the (n+1)-th partition member that defines the (n+1)-th lens chamber is provided with a third electrode, and
wherein a part of the inner surface of the top plate that defines the central lens chamber, which is equivalent to an N-th lens chamber, is provided with a first electrode, and
wherein a part of an inner surface of the (N−1)-th partition member that defines the central lens chamber is provided with a second electrode or a third electrode.

29. A camera having a stroboscopic apparatus, the stroboscopic apparatus comprising:
an optical device;
a light emitter; and
a reflecting mirror that reflects light emitted from the light emitter,
wherein the optical device included in the stroboscopic apparatus includes
a housing that has
a first sidewall member,
a second sidewall member opposed to the first sidewall member,
a third sidewall member that connects one edge of the first sidewall member and one edge of the second sidewall member,
a fourth sidewall member that connects another edge of the first sidewall member and another edge of the second sidewall member,
a top plate attached to top surfaces of the first sidewall member, the second sidewall member, the third sidewall member, and the fourth sidewall member, and
a bottom plate attached to bottom surfaces of the first sidewall member, the second sidewall member, the third sidewall member, and the fourth sidewall member, and
(M−1) partition members arranged parallel to and between the first sidewall member and the second sidewall member,
wherein M lens chambers are arranged in a side-by-side manner,
wherein each lens chamber is filled with a first liquid and a second liquid that form a liquid lens functioning as a columnar lens whose axis extends parallel to a direction in which the partition members extend,
wherein a first lens chamber is defined by the first sidewall member, the third sidewall member, a first partition member, the fourth sidewall member, the top plate, and the bottom plate,
wherein a part of an inner surface of the top plate that defines the first lens chamber is provided with a first electrode,
wherein a part of an inner surface of the first sidewall member that defines the first lens chamber is provided with a second electrode, and
wherein a part of an inner surface of the first partition member that defines the first lens chamber is provided with a third electrode,
wherein an (m+1)-th lens chamber is defined by an m-th partition member, the third sidewall member, an (m+1)-th partition member, the fourth sidewall member, the top plate, and the bottom plate, m being equal to 1, 2, . . . , or M−2,
wherein a part of the inner surface of the top plate that defines the (m+1)-th lens chamber is provided with a first electrode,
wherein a part of an inner surface of the m-th partition member that defines the (m+1)-th lens chamber is provided with a second electrode, and
wherein a part of an inner surface of the (m+1)-th partition member that defines the (m+1)-th lens chamber is provided with a third electrode, and
wherein an M-th lens chamber is defined by an (M−1)-th partition member, the third sidewall member, the second sidewall member, the fourth sidewall member, the top plate, and the bottom plate,
wherein a part of the inner surface of the top plate that defines the M-th lens chamber is provided with a first electrode,
wherein a part of an inner surface of the (M−1)-th partition member that defines the M-th lens chamber is provided with a second electrode, and
wherein a part of an inner surface of the second sidewall member that defines the M-th lens chamber is provided with a third electrode.

30. A camera having a stroboscopic apparatus, the stroboscopic apparatus comprising:
an optical device;
a light emitter; and
a reflecting mirror that reflects light emitted from the light emitter, wherein the optical device included in the stroboscopic apparatus includes
a housing that has
an outer wall member having no ends,
a top plate attached to a top surface of the outer wall member, and
a bottom plate attached to a bottom surface of the outer wall member; and
(N−1) partition members having no ends and disposed concentrically with the outer wall member,
wherein the optical device has (N−1) annular lens chambers and a central lens chamber surrounded by an (N−1)-th partition member,
wherein each lens chamber is filled with a first liquid and a second liquid that form a liquid lens,
wherein a first lens chamber is defined by the outer wall member, a first partition member, the top plate, and the bottom plate,
wherein a part of an inner surface of the top plate that defines the first lens chamber is provided with a first electrode,
wherein a part of an inner surface of the outer wall member that defines the first lens chamber is provided with a second electrode, and
wherein a part of an inner surface of the first partition member that defines the first lens chamber is provided with a third electrode,
wherein an (n+1)-th lens chamber is defined by an n-th partition member, an (n+1)-th partition member, the top plate, and the bottom plate, n being equal to 1, 2, ..., or N−2,
wherein a part of the inner surface of the top plate that defines the (n+1)-th lens chamber is provided with a first electrode,
wherein a part of an inner surface of the n-th partition member that defines the (n+1)-th lens chamber is provided with a second electrode, and
wherein a part of an inner surface of the (n+1)-th partition member that defines the (n+1)-th lens chamber is provided with a third electrode, and
wherein a part of the inner surface of the top plate that defines the central lens chamber, which is equivalent to an N-th lens chamber, is provided with a first electrode, and
wherein a part of an inner surface of the (N−1)-th partition member that defines the central lens chamber is provided with a second electrode or a third electrode.

* * * * *